United States Patent
Yapici et al.

(10) Patent No.: US 12,425,968 B2
(45) Date of Patent: Sep. 23, 2025

(54) PHYSICAL LAYER SIGNATURE FOR WAKE-UP SIGNALS

(71) Applicant: QUALCOMM Incorporated, San Diego, CA (US)

(72) Inventors: Yavuz Yapici, Florham Park, NJ (US); Igor Gutman, Hod HaSharon (IL); Tao Luo, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 403 days.

(21) Appl. No.: 17/727,477

(22) Filed: Apr. 22, 2022

(65) Prior Publication Data
US 2023/0345372 A1    Oct. 26, 2023

(51) Int. Cl.
*H04W 52/02*    (2009.01)
*H04L 5/00*    (2006.01)
(Continued)

(52) U.S. Cl.
CPC ....... *H04W 52/0232* (2013.01); *H04L 5/0051* (2013.01); *H04W 12/106* (2021.01); *H04W 12/125* (2021.01); *H04W 52/0274* (2013.01)

(58) Field of Classification Search
CPC ...... H04L 9/32; H04L 63/068; H04W 12/106; H04W 12/125; H04W 52/02
See application file for complete search history.

(56) References Cited

U.S. PATENT DOCUMENTS 9,204,394 B2 * 12/2015 Jia ................. H04W 52/0229
10,039,059 B2 * 7/2018 Näslund ............... H04L 63/123
(Continued)

FOREIGN PATENT DOCUMENTS

| EP | 4135418 A1 | 2/2023 |
|---|---|---|
| WO | WO-2016160306 A1 | 10/2016 |
| WO | WO-2021230556 A1 | 11/2021 |

OTHER PUBLICATIONS

SeungJune Yi, Radio Protocols for LTE and LTE-Advanced, Chapter 6 Medium Access Control (Wiley, 2012). Retrieved from https://learning.oreilly.com/library/view/radio-protocols-for/9781118188569/ (Year: 2012).*

(Continued)

*Primary Examiner* — Ayaz R Sheikh
*Assistant Examiner* — Christopher R Davis
(74) *Attorney, Agent, or Firm* — QUALCOMM Incorporated

(57) ABSTRACT

Methods, systems, and devices for wireless communications are described. A user equipment (UE) and network entity may determine a physical layer (PHY) signature for the network entity to include in one or more wake-up signals (WUSs) transmitted to the UE. The UE may use the determined PHY signature to validate a WUS received during a monitoring occasion. For example, the UE may compare a PHY signature of the received WUS to the determined PHY signature. If the PHY signature of the received WUS matches the determined PHY signature, the UE may wake up in accordance with the WUS. If the PHY signature of the received WUS does not match the determined PHY signature, the UE may remain in a sleep mode. The UE may transmit an indication of an adversarial attack based on the received WUS not including the determined PHY signature or including a different PHY signature.

26 Claims, 16 Drawing Sheets

(51) Int. Cl.
*H04W 12/106* (2021.01)
*H04W 12/125* (2021.01)

(56) References Cited

U.S. PATENT DOCUMENTS

| | | | | |
|---|---|---|---|---|
| 11,284,350 | B2* | 3/2022 | Jiang | H04W 72/04 |
| 12,200,785 | B2* | 1/2025 | Ye | H04W 76/11 |
| 2019/0132870 | A1* | 5/2019 | Guey | H04W 74/08 |
| 2020/0344598 | A1* | 10/2020 | Nam | H04W 12/30 |
| 2021/0022078 | A1 | 1/2021 | Agardh et al. | |
| 2021/0092593 | A1* | 3/2021 | Yunusov | H04B 7/063 |
| 2022/0225092 | A1* | 7/2022 | Malek-Mohammadi | H03K 23/54 |

OTHER PUBLICATIONS

Wolfgang Osterhage, Wireless Network Security, 2nd Edition, Chapter 4 Mobile Phones (CRC Press, 2018). Retrieved from https://learning.oreilly.com/library/view/wireless-network-security/9781351603942 (Year: 2018).*

Sassan Ahmadi, 5G NR Architecture, Technology, Implementation, and Operation of 3GPP New Radio Standards, Section 1.5.2 (Academic Press, 2019). Retrieved from https://learning.oreilly.com/library/view/5g-nr/9780128134023/ (Year: 2019).*

Erik Dahlman, 5G NR: The Next Generation Wireless Access Technology, Chapter 6 (Academic Press, 2018). Retrieved from https://learning.oreilly.com/library/view/5g-nr-the/9780128143247/ (Year: 2018).*

S. Rostami, P. Kela, K. Leppanen and M. Valkama, Wake-up Radio-Based 5G Mobile Access: Methods, Benefits, and Challenges, in IEEE Communications Magazine, vol. 58, No. 7, pp. 14-20. (Year: 2020).*

International Search Report and Written Opinion—PCT/US2023/018719—ISA/EPO—Jul. 19, 2023.

* cited by examiner

PHYSICAL LAYER SIGNATURE FOR WAKE-UP SIGNALS

FIELD OF TECHNOLOGY

The following relates to wireless communications, including a physical layer (PHY) signature for wake-up signals (WUSs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support physical layer (PHY) signature for wake-up signal (WUS). In particular, the described techniques provide for added security to WUSs enabling protection against a number of malicious attacks. For example, a user equipment (UE) and an associated network entity may agree to apply a PHY signature to one or more WUSs transmitted by the network entity. When the UE receives a WUS, the UE may check if the identified WUS includes the agreed-upon PHY signature. If the received WUS includes a PHY signature that matches the agreed-upon PHY signature, the UE may operate in accordance with the received WUS. If the received WUS includes a PHY signature that does not match the agreed-upon PHY signature (or if the received WUS does not include a PHY signature), the UE may ignore the received WUS and refrain from waking up. In such cases, the received WUS may be determined to be a false WUS and flagged as potentially malicious. Here, the UE may initiate a procedure to let the network know of an attempted malicious attack based on the false WUS. In some examples, the UE and network entity may determine the agreed-upon PHY signature by transmitting PHY signature parameters via medium access control-control element (MAC-CE) or radio resource control (RRC) links while the UE is in an awake mode. In some examples, the network entity may define a set of PHY signatures that may be indexed and associated with a signature pool, where the network entity and the UE may exchange the index or determine the index by measuring a one or more features (e.g., characteristics) of a channel, or both, to agree upon a PHY signature.

A method for wireless communications is described. The method may include receiving a message indicating a configuration for one or more WUSs, the configuration indicating whether the one or more WUSs are modified by a PHY signature, receiving a WUS during a monitoring occasion associated with a discontinuous reception (DRX) cycle, and communicating with a network entity based on a comparison between a PHY signature of the received WUS and an expected PHY signature in accordance with the configuration.

An apparatus for wireless communications is described. The apparatus may include a processor, memory coupled with the processor, and instructions stored in the memory. The instructions may be executable by the processor to cause the apparatus to receive a message indicating a configuration for one or more WUSs, the configuration indicating whether the one or more WUSs are modified by a PHY signature, receive a WUS during a monitoring occasion associated with a DRX cycle, and communicate with a network entity based on a comparison between a PHY signature of the received WUS and an expected PHY signature in accordance with the configuration.

Another apparatus for wireless communications is described. The apparatus may include means for receiving a message indicating a configuration for one or more WUSs, the configuration indicating whether the one or more WUSs are modified by a PHY signature, means for receiving a WUS during a monitoring occasion associated with a DRX cycle, and means for communicating with a network entity based on a comparison between a PHY signature of the received WUS and an expected PHY signature in accordance with the configuration.

A non-transitory computer-readable medium storing code for wireless communications is described. The code may include instructions executable by a processor to receive a message indicating a configuration for one or more WUSs, the configuration indicating whether the one or more WUSs are modified by a PHY signature, receive a WUS during a monitoring occasion associated with a DRX cycle, and communicate with a network entity based on a comparison between a PHY signature of the received WUS and an expected PHY signature in accordance with the configuration.

Some examples of the method, apparatuses, and non-transitory computer-readable medium described herein may further include operations, features, means, or instructions for determining one or more parameters associated with the PHY signature and transmitting a second message indicating the one or more parameters, where the configuration indicating whether the one or more WUSs may be modified by the PHY signature may be based on transmitting the second message indicating the one or more parameters.

In some examples of the method, apparatuses, and non-transitory computer-readable medium described herein, the second message may be transmitted via a MAC-CE, or RRC signaling, or any combination thereof.

Some examples of the method, apparatuses, and non-transitory computer-readable medium described herein may further include operations, features, means, or instructions for receiving a third message indicating one or more parameters associated with the PHY signature, where the configuration indicating whether the one or more WUSs may be modified by the PHY signature may be based on the one or more parameters.

In some examples of the method, apparatuses, and non-transitory computer-readable medium described herein, the third message may be transmitted via a MAC-CE, or RRC signaling, or any combination thereof.

Some examples of the method, apparatuses, and non-transitory computer-readable medium described herein may further include operations, features, means, or instructions for receiving a first control message indicating a signature pool including a set of PHY signatures including the PHY signature, where each PHY signature of the set of PHY signatures may be associated with a respective index.

Some examples of the method, apparatuses, and non-transitory computer-readable medium described herein may further include operations, features, means, or instructions for transmitting a second control message including an index of the PHY signature, where the configuration indicating whether the one or more WUSs may be modified by the PHY signature may be based on transmitting the second control message.

Some examples of the method, apparatuses, and non-transitory computer-readable medium described herein may further include operations, features, means, or instructions for receiving a third control message including an index of the PHY signature, where the configuration indicating whether the one or more WUSs may be modified by the PHY signature may be based on the index of the PHY signature.

Some examples of the method, apparatuses, and non-transitory computer-readable medium described herein may further include operations, features, means, or instructions for receiving one or more reference signals on a channel between the UE and the network entity and selecting an index of the PHY signature based on one or more characteristics of the channel, the one or more characteristics being determined based on measuring the one or more reference signals.

In some examples of the method, apparatuses, and non-transitory computer-readable medium described herein, the one or more reference signals include demodulated reference signals.

Some examples of the method, apparatuses, and non-transitory computer-readable medium described herein may further include operations, features, means, or instructions for transmitting one or more reference signals on a channel between the UE and the network entity, where an index of the PHY signature may be based on one or more characteristics of the channel, the one or more characteristics being based on the one or more reference signals.

In some examples of the method, apparatuses, and non-transitory computer-readable medium described herein, the one or more reference signals include a sounding reference signal, a demodulated reference signal, or any combination thereof.

Some examples of the method, apparatuses, and non-transitory computer-readable medium described herein may further include operations, features, means, or instructions for determining that the received WUS includes the PHY signature based on the comparison between the received WUS and the expected WUS and transitioning to an awake state based on the determination.

Some examples of the method, apparatuses, and non-transitory computer-readable medium described herein may further include operations, features, means, or instructions for determining that the received WUS does not include the PHY signature based on the comparison between the received WUS and the expected WUS and remaining in an off state of the DRX cycle based on the determination.

Some examples of the method, apparatuses, and non-transitory computer-readable medium described herein may further include operations, features, means, or instructions for transmitting an indication of an adversarial attack based on the received WUS not including the PHY signature.

In some examples of the method, apparatuses, and non-transitory computer-readable medium described herein, the message indicating the configuration for the one or more WUSs further includes one or more monitoring occasions to monitor for the one or more WUSs.

A method for wireless communications is described. The method may include transmitting a message indicating a configuration for one or more WUSs, the configuration indicating whether the one or more WUSs are modified by a PHY signature, transmitting a WUS modified by the PHY signature during a monitoring occasion associated with a DRX cycle, and communicating with a UE based on transmitting the WUS modified by the PHY signature.

An apparatus for wireless communications is described. The apparatus may include a processor, memory coupled with the processor, and instructions stored in the memory. The instructions may be executable by the processor to cause the apparatus to transmit a message indicating a configuration for one or more WUSs, the configuration indicating whether the one or more WUSs are modified by a PHY signature, transmit a WUS modified by the PHY signature during a monitoring occasion associated with a DRX cycle, and communicate with a UE based on transmitting the WUS modified by the PHY signature.

Another apparatus for wireless communications is described. The apparatus may include means for transmitting a message indicating a configuration for one or more WUSs, the configuration indicating whether the one or more WUSs are modified by a PHY signature, means for transmitting a WUS modified by the PHY signature during a monitoring occasion associated with a DRX cycle, and means for communicating with a UE based on transmitting the WUS modified by the PHY signature.

A non-transitory computer-readable medium storing code for wireless communications is described. The code may include instructions executable by a processor to transmit a message indicating a configuration for one or more WUSs, the configuration indicating whether the one or more WUSs are modified by a PHY signature, transmit a WUS modified by the PHY signature during a monitoring occasion associated with a DRX cycle, and communicate with a UE based on transmitting the WUS modified by the PHY signature.

Some examples of the method, apparatuses, and non-transitory computer-readable medium described herein may further include operations, features, means, or instructions for receiving, a second message indicating one or more parameters associated with the PHY signature, where the configuration indicating whether the one or more WUSs may be modified by the PHY signature may be based on the one or more parameters.

In some examples of the method, apparatuses, and non-transitory computer-readable medium described herein, the second message may be received via a MAC-CE, or RRC signaling, or any combination thereof.

Some examples of the method, apparatuses, and non-transitory computer-readable medium described herein may further include operations, features, means, or instructions for determining one or more parameters associated with the PHY signature and transmitting, a third message indicating the one or more parameters associated with the PHY signature, where the configuration indicating whether the one or more WUSs may be modified by the PHY signature may be based on transmitting the third message indicating the one or more parameters.

In some examples of the method, apparatuses, and non-transitory computer-readable medium described herein, the third message may be received via a MAC-CE, or RRC signaling, or any combination thereof.

Some examples of the method, apparatuses, and non-transitory computer-readable medium described herein may further include operations, features, means, or instructions for generating a signature pool including a set of PHY signatures including the PHY signature, where each PHY signature of the set of PHY signatures may be associated with a respective index and transmitting a first control message indicating the signature pool based on generating the signature pool.

Some examples of the method, apparatuses, and non-transitory computer-readable medium described herein may further include operations, features, means, or instructions for receiving, a second control message including an index of the PHY signature, where the configuration indicating whether the one or more WUSs may be modified by the PHY signature may be based on receiving the second control message.

Some examples of the method, apparatuses, and non-transitory computer-readable medium described herein may further include operations, features, means, or instructions for transmitting a third control message including an index of the PHY signature, where the configuration indicating whether the one or more WUSs may be modified by the PHY signature may be based on the index of the PHY signature.

Some examples of the method, apparatuses, and non-transitory computer-readable medium described herein may further include operations, features, means, or instructions for receiving one or more reference signals on a channel between the UE and the network entity and selecting an index of the PHY signature based on one or more characteristics of the channel, the one or more characteristics being determined based on measuring the one or more reference signals.

Some examples of the method, apparatuses, and non-transitory computer-readable medium described herein may further include operations, features, means, or instructions for transmitting one or more reference signals on a channel between the UE and the network entity, where an index of the PHY signature may be based on one or more characteristics of the channel, the one or more characteristics being based on the one or more reference signals.

In some examples of the method, apparatuses, and non-transitory computer-readable medium described herein, communicating based on transmitting the WUS modified by the PHY signature may include operations, features, means, or instructions for receiving an indication of an adversarial attack based on the UE receiving a second WUS not including the PHY signature.

In some examples of the method, apparatuses, and non-transitory computer-readable medium described herein, the message indicating the configuration for the one or more WUSs may include operations, features, means, or instructions for one or more monitoring occasions for the UE to monitor for the one or more WUSs.

DETAILED DESCRIPTION

Figure 1:
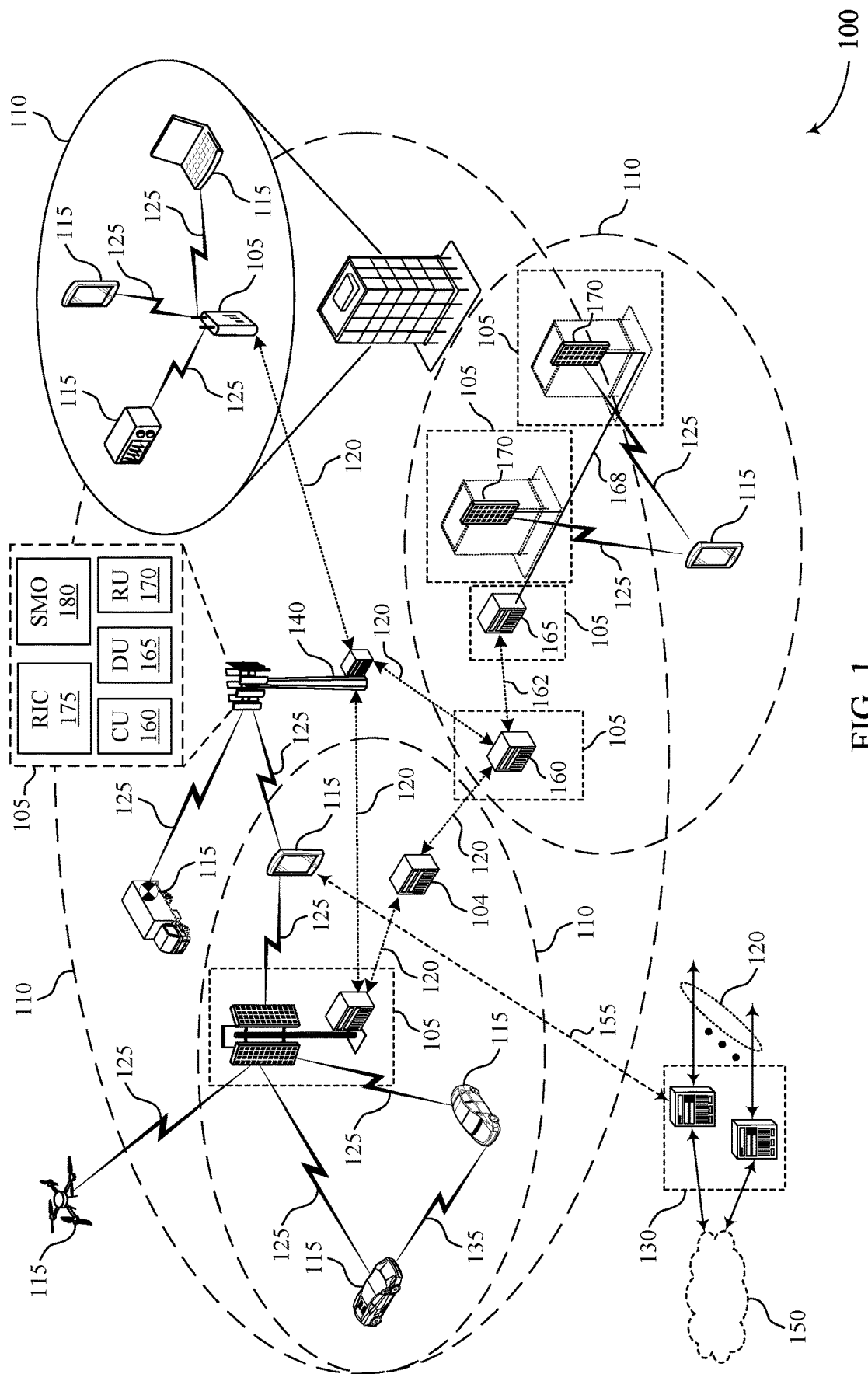
FIG. 1 illustrates an example of a wireless communications system that supports a physical layer (PHY) signature for wake-up signals (WUSs) in accordance with one or more aspects of the present disclosure.

In some wireless communications systems, a network and associated wireless devices may utilize one or more upper-layer cryptographic techniques to increase confidentiality and security of data transmissions. In some cases, however, increasing the security associated with data transmissions may introduce latency into the system. As such, data transmissions over the physical layer (PHY) may refrain from using cryptographic techniques to reduce latency. However, malicious adversaries may attack unprotected transmissions by fabricating fake PHY transmissions (e.g., using a physical downlink control channel (PDCCH) or a physical downlink shared channel (PDSCH)). For example, an intruding network entity may transmit one or more wake-up signals (WUSs) to an unsuspecting user equipment (UE) to interfere with operations at the UE. In some cases, the one or more WUSs may cause a UE to remain awake, thus draining the battery at a relatively faster rate, which may be detrimental to power conservation at the UE. Additionally, or alternatively, the intruding network entity may transmit WUSs to wake up multiple UEs at a same time to crash the associated network and to cause channel instabilities.

The network may provide additional security for a number of malicious attacks by operating in accordance with the techniques described herein. For example, a UE and associated network entity may agree to apply a PHY signature (e.g., an artificial PHY impairment, such as an AM/PM impairment, and in-phase and quadrature-phase (IQ) mismatch) to one or more WUSs. For example, if the UE receives a WUS, the UE may check if the identified WUS includes the agreed-upon PHY signature. If the PHY signature of the received WUS matches the agreed-upon PHY signature, the UE may operate in accordance with the received WUS. If the PHY signature of the received WUS does not match the agreed-upon PHY signature, the UE may ignore the received WUS and refrain from waking up. In some cases, the UE may initiate a procedure to notify the network of an attempted malicious attack.

In some examples, the UE and network entity may determine the agreed-upon PHY signature by transmitting PHY signature parameters via medium access control (MAC)-control element (CE) or radio resource control (RRC) signaling, for example, while the UE is in an awake mode. In some examples, the network entity may define a set of PHY signatures that may be indexed and associated with a signature pool. As such, either the UE or the network entity may explicitly transmit an indication of an index for which PHY signature to use for a next WUS cycle. Additionally, or alternatively, the network entity and UE may determine which index to use for the next WUS cycle by individually measuring one or more parameters associated with the communication channel (e.g., received signal strength (RSS), phase, or the like).

Aspects of the disclosure are initially described in the context of wireless communications systems. Aspects of the disclosure are further illustrated by and described with reference to discontinuous reception (DRX) timing diagrams and process flows. Aspects of the disclosure are further illustrated by and described with reference to apparatus diagrams, system diagrams, and flowcharts that relate to a PHY signature for WUSs.

FIG. 1 illustrates an example of a wireless communications system 100 that supports a PHY signature for WUSs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a PHY signature for WUSs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined PHY structure for supporting the communication links 125. For example, a carrier used for a communication link 125 may include a portion of a RF spectrum band (e.g., a bandwidth part (BWP)) that is operated according to one or more PHY channels for a given radio access technology (e.g., LTE, LTE-A, LTE-A Pro, NR). Each PHY channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In wireless communications system 100, a network entity 105 and associated UEs 115 may utilize one or more upper-layer cryptographic techniques to increase confidentiality and security of data transmissions. In some cases, however, data transmissions over the PHY may refrain from using cryptographic techniques to reduce latency associated with the network. However, malicious adversaries may attack unprotected transmissions by fabricating fake PHY transmissions. For example, an intruding network entity 105 or other device may transmit one or more WUSs to an unsuspecting UE 115 to interfere with operations at the UE 115.

The wireless communications system 100 may implement schemes to protect against malicious attacks by operating in accordance with the techniques described herein. For example, a UE 115 and an associated network entity 105 may agree to apply a PHY signature to one or more WUSs. In such cases, if the UE 115 receives a WUS, the UE 115 may check if the identified WUS includes the agreed-upon PHY signature. If the received WUS includes a PHY signature that matches the agreed-upon PHY signature, the UE 115 may operate in accordance with the received WUS (e.g., the UE 115 may wake from a sleep state). If the received WUS includes a PHY signature that does not match the agreed-upon PHY signature, or if the received WUS does not include the agree-upon PHY signature, the UE 115 may ignore the received WUS and refrain from waking up. In some examples, the UE 115 may initiate a procedure to let the network know of an attempted malicious attack based on the received WUS including a different PHY signature than what is expected.

In some examples, the UE 115 and network entity 105 may determine the agreed-upon PHY signature by transmitting PHY signature parameters, for example, while the UE 115 is in an awake mode. In some examples, the network entity 105 may define a set of PHY signatures that may be indexed and associated with a signature pool. As such, either the UE 115 or the network entity 105 may explicitly transmit an indication of an index for which PHY signature to use for a next WUS cycle. Additionally, or alternatively, the network entity 105 and UE 115 may determine which index to use for the next WUS cycle by individually measuring a feature (e.g., a characteristic) associated with the communication channel.

Figure 2:
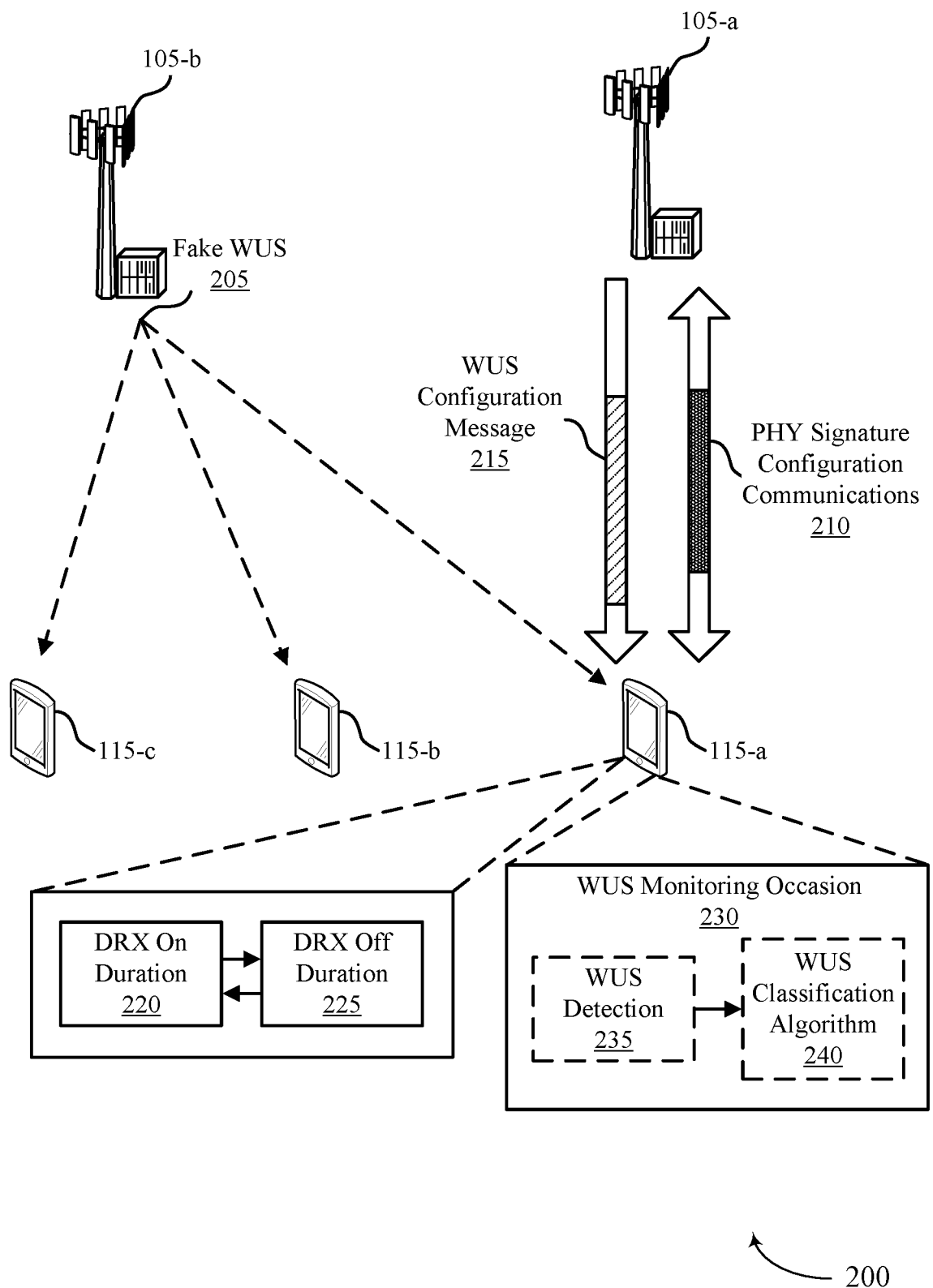
FIG. 2 illustrates an example of a wireless communications system that supports a PHY signature for WUSs in accordance with one or more aspects of the present disclosure.

FIG. 2 illustrates an example of a wireless communications system 200 that supports a PHY signature for WUSs in accordance with one or more aspects of the present disclosure. In some examples, wireless communications system 200 may implement one or more aspects of wireless communications system 100. For instance, a UE 115-a, a UE 115-b, and a UE 115-c may be examples of a UE 115 with reference to FIG. 1. Additionally, or alternatively, a network entity 105-a and a network entity 105-b may be examples of a network entity 105 with reference to FIG. 1. While examples are discussed herein, any number of devices and device types may be used to accomplish implementations described in the present disclosure. Wireless communications system 200 may support indications between a first and second wireless device to determine a PHY signature to include in one or more future WUS transmissions for authentication of the one or more WUSs.

In some examples of wireless communications system 200, a network and associated wireless devices may utilize one or more upper-layer cryptographic techniques to increase confidentiality of the data transmissions. Such cryptographic techniques may increase the availability of secure network services (e.g., against denial attacks). In some cases, however, increasing the security associated with data transmissions may introduce latency into the network. As such, the wireless devices of wireless communications system 200 may refrain from using cryptographic techniques for one or more PHY transmissions based on one or more characteristics of the associated data transmission or associated channel type. For example, MAC signaling via a control element, broadcast information via a system information block (SIB), or paging information may include low latency data and therefore may not utilize the cryptographic techniques described herein.

As such, one or more malicious adversaries may attack one or more wireless devices of the wireless communications system 200 by fabricating fake messages (e.g., using PDCCH or a PDSCH). For example, a malicious adversary (e.g., the network entity 105-b) may exploit one or more functionalities of the UEs 115-a through 115-c by transmitting a fake WUS 205. In some examples, a WUS may be a message transmitted from a network entity 105 to a UE 115 via a PDCCH while the UE 115 is operating in accordance with a DRX mode. For instance the network entity may transmit a WUS to the UE 115 before a DRX on duration 220 of the UE 115 to indicate whether the UE 115 should keep an associated receiver on to receive data or turn off the associated receiver to sleep and save energy. As a result of WUS functionality, the network entity 105-a may mislead and interfere with operation of the UEs 115-a through 115-c. In some examples, one or more fake WUSs 205 may cause the UEs 115-*a* through 115-*c* to remain awake, thus draining an associated battery at a faster rate. Additionally, or alternatively, the network entity 105-*b* may transmit one or more fake WUSs 205 to cause a relatively large number of UEs 115 (e.g., the UEs 115-*a* through 115-*c*, among other UEs 115) to wake up simultaneously, which may potentially crash the network (e.g., via an increase in signaling overhead) and result in other instabilities. In some other examples, a fake PDCCH may block a UE 115 from receiving or transmitting data, which in turn may damage the reliability of the associated links. Without security at the PHY level for L1 and L2 signaling and channels, a UE 115 may be unable to distinguish between legitimate and fabricated messages, which may lead to the UE 115 performing operations in PHY that may not be recoverable in upper layers.

The network and associated wireless devices may protect against malicious attacks by operating in accordance with the techniques described herein. For example, the UE 115-*a* and the network entity 105-*a* may exchange one or more PHY signature configuration communications 210 to determine a PHY signature to include one or more WUSs. The PHY signature may be used to identify whether a WUS received at the UE 115-*a* is legitimate (e.g., identify whether the received WUS is from the network entity 105-*a* or is a fake WUS 205 from a malicious adversary). As a result, the UE 115-*a* may identify a malicious attack when a fake WUS 205 is received, thereby reducing the number of malicious successes by analyzing the signature of the received WUS and comparing it to the expected signature agreed-upon during the PHY signature configuration communications 210.

In some examples, a PHY signature may be an example of one or more impairments artificially added to a WUS by the network entity 105-*a*. In some implementations, the PHY signature may be an AM/PM impairment. For example, an AM/PM impairment may be a physical impairment that does not result in energetic limitations or an increase in power consumption. In some examples, the network entity 105-*a* may add the AM/PM impairment to a base band (BB) rate of a WUS (e.g., for frequency range 1 (FR1), where out-of-band (OOB) communications are limited) using digital pre-distortion (DPD) techniques. In some implementations, the PHY signature may be an IQ mismatch in which a phase associated with a WUS is artificially shifted. Other PHY signatures that result in some impairment to a transmitted PHY signal may be used, and the examples described herein shall not be considered limiting to the scope covered by the claims or the disclosure. In any case, a chosen PHY signature (e.g., an impairment) may have associated PHY signature parameters used to successfully remove the artificial impairment included in a WUS.

In some implementations, either the network entity 105-*a* or the UE 115-*a* may individually determine the PHY signature and associated PHY signature parameters. Based on determining the PHY signature parameters, either the network entity 105-*a* or the UE 115-*a* may transmit a message indicating the one or more PHY signature parameters to the other wireless device during the PHY signature configuration communications 210. In some examples, the network entity 105-*a* or the UE 115-*a* may transmit the one or more PHY signature parameters via a MAC-CE, a RRC message, or a combination thereof.

In some implementations, the network entity 105-*a* may define a set of PHY signatures, which are indexed and gathered in a signature pool. As such, during the PHY signature configuration communications 210 the network entity 105-*a* may transmit a control message configuring the UE 115-*a* with the signature pool. In some examples, either the UE 115-*a* or the network entity 105-*b* may select a PHY signature from the resource pool and transmit a control message to the other wireless device indicating the index associated with the selected PHY signature. The UE 115-*a* and network entity 105-*a* may convey the index to the other wireless device using MAC-CE, RRC signaling, physical control channels (e.g., downlink control information (DCI) for transmissions from the network entity 105-*a* and uplink control information (UCI) for transmission from the UE 115-*a*), or any combination thereof.

In some examples, the network entity 105-*a* and the UE 115-*a* may determine the index of the PHY signature by individually measuring a feature of a channel associated with both wireless devices. For example, during the PHY signature configuration communications 210, the UE 115-*a* may receive one or more reference signals (e.g., demodulated reference signals (DMRSs)) on the channel and select an index of the signature pool based on one or more characteristics of the channel. In some examples, during the PHY signature configuration communications 210, the network entity 105-*a* may receive one or more reference signals (e.g., DMRSs or sounding reference signals (SRS)) on the channel and select an index of the signature pool based on one or more characteristics of the channel. In some instances, the one or more characteristics of the channel may include a received signal strength (RSS), or a phase associated with the one or more reference signals, among other examples.

Based on the network entity 105-*a* and the UE 115-*a* agreeing upon the PHY signature and the associated PHY signature parameters during the PHY signature configuration communications 210, the network entity 105-*a* may transmit a WUS configuration message 215 to the UE 115-*a*. In some examples, the WUS configuration message 215 may indicate a configuration for one or more WUSs, where the configuration further indicates whether the one or more WUSs are modified with the agreed-upon PHY signature. The WUS configuration message 215 may also configure the UE 115-*a* with a set of WUS monitoring occasions 230, in which the UE 115-*a* may monitor for a WUS during a DRX off duration 225. In some examples, the UE 115-*a* may receive the WUS configuration message 215 during a DRX on duration 220, and transition to the DRX off duration 225 based on the WUS configuration message 215.

In some cases, the UE 115-*a* may monitor for a WUS during a configured WUS monitoring occasion 230 using an associated wake-up radio (WUR) located at the UE 115-*a*. In some examples of a WUS monitoring occasion 230, the UE 115-*a* may experience a WUS detection 235 in which the UE 115-*a* receives a WUS. Based on agreeing upon a PHY signature with the network entity 105-*a*, the UE 115-*a* may run a WUS classification algorithm 240 to identify whether the received WUS includes the agreed-upon PHY signature and associated PHY signature parameters. In cases where the WUS classification algorithm 240 determines that the received WUS includes the agreed-upon PHY signature, the UE 115-*a* may operate in accordance with the WUS and transition to a DRX on duration 220. In cases where the WUS classification algorithm 240 determines that the received WUS does not include the agreed-upon PHY signature, the UE 115-*a* may remain in the DRX off duration 225. Additionally, or alternatively, the UE 115-*a* may transmit an indication to the network entity 105-*a* indicating an adversarial attack (e.g., a bridge attempt) based on receiving the fake WUS 205.

By operating in accordance with the PHY signature configuration communications 210 and the subsequent agreed-upon PHY signature, the network entity 105-*a* and the UE 115-*a* may decrease the number of successful adversarial attacks, increasing the security of communications in the wireless communications system 200. Further, the UE 115-*a* may benefit from an increase in DRX mode reliability, thereby reducing power consumption at the UE 115-*a*.

Figure 3:
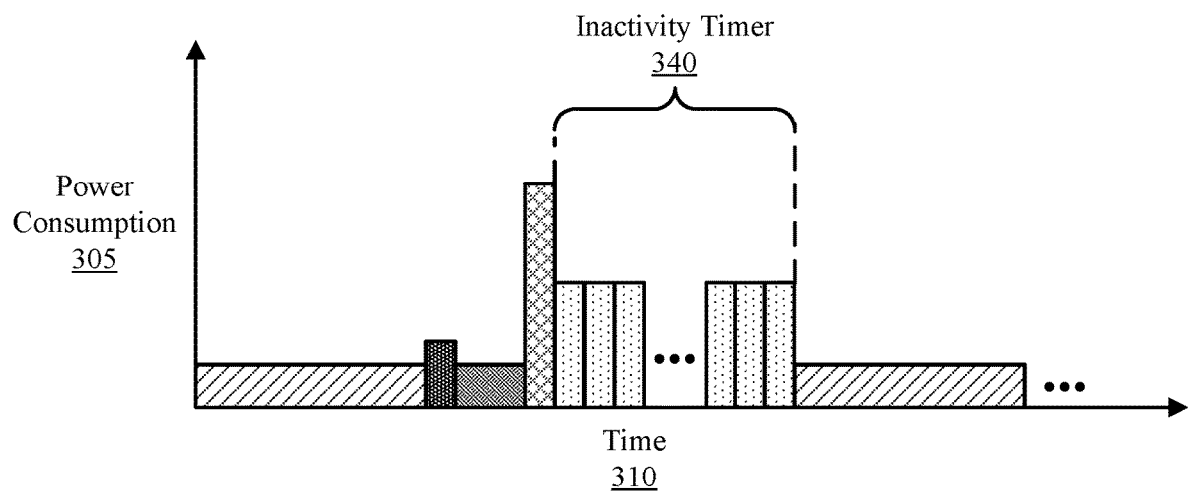
FIG. 3 illustrates an example of a discontinuous reception (DRX) timing diagram that supports a PHY signature for WUSs in accordance with one or more aspects of the present disclosure.
Figure 3:
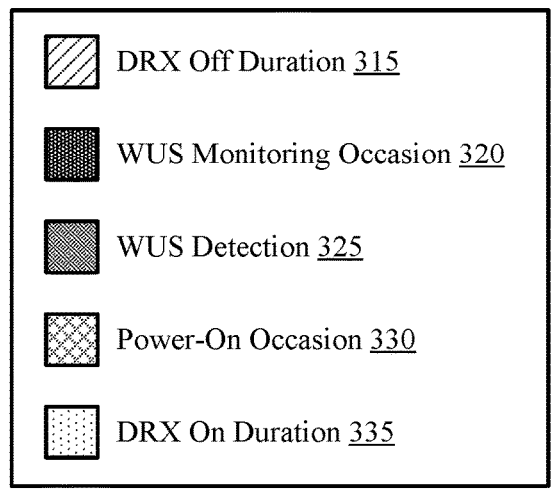

FIG. 3 illustrates an example of a DRX timing diagram 300 that supports a PHY signature for WUSs in accordance with one or more aspects of the present disclosure. In some examples, DRX timing diagram 300 may implement one or more aspects of wireless communications system 100 and wireless communications system 200. For instance, the DRX timing diagram 300 may be an example of DRX operations performed by a UE 115 according to the techniques described herein, including with reference to FIGS. 1 and 2. While examples are discussed herein with reference to a UE 115, any number of devices and device types may be used to accomplish implementations described in the present disclosure.

As illustrated in FIG. 3, the DRX timing diagram 300 may display a power consumption 305 of a UE 115 over a duration of time 310 based on the UE 115 operating in accordance with DRX techniques. In some examples, the UE 115 may operate in accordance with DRX timing diagram 300 based on receiving a WUS configuration message (e.g., a WUS configuration message 215, as described with reference to FIG. 2). For example, the WUS configuration message may configure the UE 115 with a set of WUS monitoring occasions 320 in which the UE 115 may monitor for a WUS during a DRX off duration 315.

In some examples, a WUR associated with the UE 115 may be operable for WUS detection during a WUS monitoring occasion 320 via a two-stage wakeup sequence. For example, the WUR may detect a WUS during the WUS monitoring occasion 320 (e.g., a WUS detection 325 occasion) using DMRS of a PDCCH associated with the UE 115. Based on the WUS detection 325 occasion, the UE 115 may perform a power-on occasion 330 and use the associated WUR to monitor for scheduled PDCCHs and receive control data during a DRX on duration 335. In some examples, the DRX on duration 335 may have an associated inactivity timer 340 such that if the UE 115, after decoding a received PDCCH, does not receive data (e.g., via PDSCH) or transmit data (e.g., via PUSCH) for longer than the duration of the inactivity timer 340, the UE 115 may transition back to the DRX off duration 315.

The two-stage wakeup sequence may enable low-power implementation at the UE 115 for PDCCH detection based on characteristics associated with WUS detection during the WUS monitoring occasion 320. For example, the UE 115 may benefit from a decrease in sensitivity to phase noise and to receiver nonlinearity. Additionally, or alternatively, a digital front-end of the UE 115 may benefit from a decrease in signal to noise ratio (SNR). In some examples, the UE 115 may benefit from a parameter reduction (e.g., reduced bandwidth, reduced number of candidates, and reduced aggregation level), and the UE 115 may further benefit from a relatively reduced operating point for the voltage levels and clock frequencies of associated hardware.

As illustrated in FIG. 3, power consumption 305 at the UE 115 increases during the power-on occasion 330 and the DRX on duration 335. As such, to further reduce the power consumption 305, the UE 115 may utilize a WUS classification algorithm (e.g., the WUS classification algorithm 240 with reference to FIG. 3) to prevent power-on occasions 330 resulting from fake WUSs. For example, during a DRX on duration 335, the UE 115 and a network entity 105 may agree upon a PHY signature to include in WUSs for validation of the WUSs at the UE 115. As such, if the UE 115 receives a WUS during a WUS monitoring occasion 320 that does not include the agreed-upon signature, the UE 115 may refrain from transitioning to the DRX on duration 335. By remaining in the DRX off duration 315, the UE 115 may reduce power consumption 305 incurred from the power-on occasion 330 and DRX on duration 335. As such, the UE 115 may benefit from reduction in power consumption 305 based on using the WUS classification algorithm 240 during a WUS detection 325 to validate the received WUS.

Figure 4:
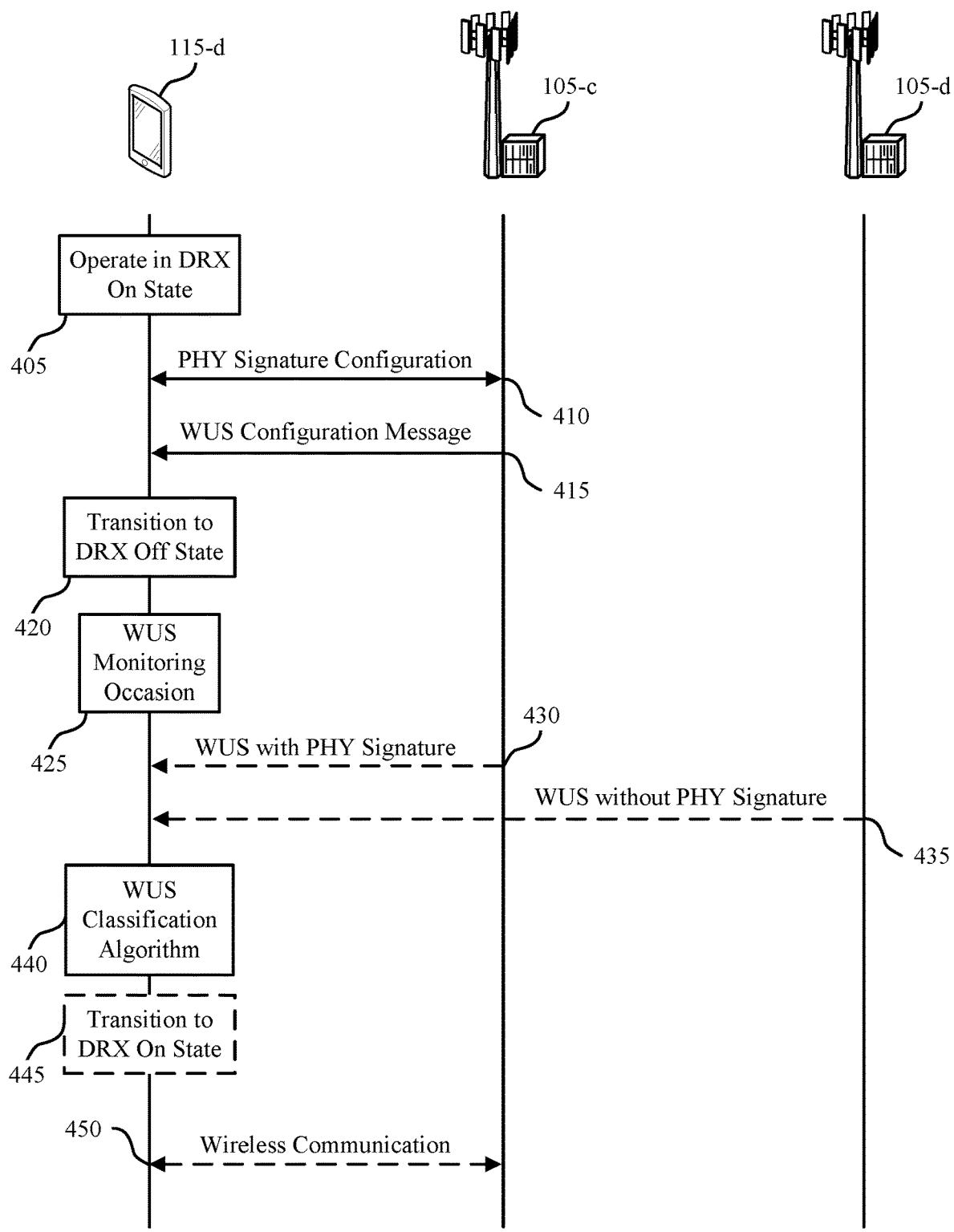
FIG. 4 illustrates an example of a process flow that supports a PHY signature for WUSs in accordance with one or more aspects of the present disclosure.

FIG. 4 illustrates an example of a process flow 400 in a system that supports a PHY signature for WUSs in accordance with one or more aspects of the present disclosure. In some examples, process flow 400 may implement aspects of wireless communications system 100, wireless communications system 200, DRX timing diagram 300, or a combination thereof. Process flow 400 includes a UE 115-*d*, a network entity 105-*c*, and a network entity 105-*d* which may be respective examples of a UE 115 and a network entity 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 400 shows processes between a single UE 115 and two network entities 105, it should be understood that these processes may occur between any number of wireless devices, network devices, and/or network device types.

At 405, the UE 115-*d* may operate in accordance with a DRX on state, in which the UE 115-*d* may communicate with one or more network devices (e.g., the network entity 105-*c*).

At 410, the UE 115-*d* and the network entity 105-*c* may communicate one or more messages as part of a PHY signature configuration. In some examples, the PHY signature configuration may be a process in which the UE 115-*d* and the network entity 105-*c* determine a PHY signature and a set of associated PHY signature parameters, where the PHY signature may be included in one or more WUSs transmitted by the network entity 105-*c* for validation at the UE 115-*d*.

In some examples, the UE 115-*d* may determine one or more parameters associated with the PHY signature and transmit to the network entity 105-*c* a message indicating the one or more parameters. In some examples, the UE 115-*d* may receive, and the network entity 105-*c* may transmit, a message indicating the one or more parameters. In some examples, the UE 115-*d* may transmit or receive the one or more parameters via a MAC-CE, RRC signaling, or a combination thereof.

In some examples, the UE 115-*d* may receive, and the network entity 105-*c* may transmit, a control message indicating a signature pool including a set of PHY signatures including the PHY signature, where each PHY signature of the set of PHY signatures is associated with a respective index. In some examples, the UE 115-*d* may transmit to the network entity 105-*c* a control message indicating an index of the signature pool associated with the PHY signature. In some examples, the UE 115-*d* may receive, and the network entity 105-*c* may transmit, a control message indicating an index of the signature pool associated with the PHY signature.

Additionally, or alternatively, the UE 115-d and the network entity 105-c may determine the index of the signature pool based on communicating one or more reference signals on a channel between the UE 115-d and the network entity 105-c. For example, the UE 115-d may receive one or more reference signals from the network entity 105-c on the channel and select an index of the PHY signature based on one or more characteristics of the channel. In some cases, the one or more characteristics may be determined based on measuring the one or more reference signals. For instance, the one or more reference signals received at the UE 115-d may be DMRSs. In some examples, the network entity 105-c may also receive one or more reference signals from the UE 115-d on the channel, and the network entity 105-c may select an index of the PHY signature based on one or more characteristics of the channel. In such cases, the one or more characteristics may be determined based on measuring the one or more reference signals. In some examples, the one or more reference signals received at the network entity 105-c may be DMRSs, SRSs, or a combination thereof.

At 415, the UE 115-d may receive, and the network entity 105-c may transmit, a WUS configuration message indicating a configuration for one or more WUSs, where the configuration may indicate whether the one or more WUSs are modified by the agreed-upon PHY signature (e.g., at 410).

At 420, the UE 115-d may transition to a DRX off state based on receiving the WUS configuration message at 415.

At 425, the UE 115-d may monitor for one or more WUSs during a monitoring occasion associated with the DRX cycle. In some examples, the UE 115-d may be configured with one or more monitoring occasions to monitor for one or more WUSs based on receiving the WUS configuration message at 415.

In some examples, at 430, the UE 115-d may receive a WUS from the network entity 105-c during the monitoring occasion. In such examples, the WUS may include the PHY signature agreed-upon by the UE 115-d and the network entity 105-c at 410. In some examples, at 435, the UE 115-d may receive a WUS from the network entity 105-d during the monitoring occasion. In such examples, the WUS from the network entity 105-d may not include the PHY signature agreed-upon by the UE 115-d and the network entity 105-c at 410.

At 440, the UE 115-d may perform a WUS classification algorithm based on receiving a WUS from either the network entity 105-c at 430 or the network entity 105-d at 435. In some examples, the WUS classification algorithm may compare a PHY signature of the received WUS and the expected PHY signature agreed-upon by the UE 115-d and the network entity 105-c at 410.

If the UE 115-d determines that the received WUS includes the PHY signature based on the comparison between a signature of the received WUS and the expected PHY signature (e.g., corresponding to an expected WUS), then at 445, the UE 115-d may transition to the DRX on state. In such examples, at 450, the UE 115-d may communicate with the network entity 105-c in accordance with the received WUS based on the received WUS including the agreed-upon PHY signature.

If the UE 115-d determines that the received WUS does not include the PHY signature based on the comparison between a signature of the received WUS and the expected PHY signature, then the UE 115-d may refrain from transitioning to the DRX on state and remain in the DRX off state.

In some cases, at 450, the UE 115-d may transmit to the network entity 105-c an indication of an adversarial attack based on the received WUS not including the PHY signature. For example, if the received WUS does not include the expected PHY signature, or the received WUS includes some signature that is different from the expected PHY signature (e.g., based on a comparison), the UE 115-d may transmit an indication of a potential malicious attack.

Figure 5:
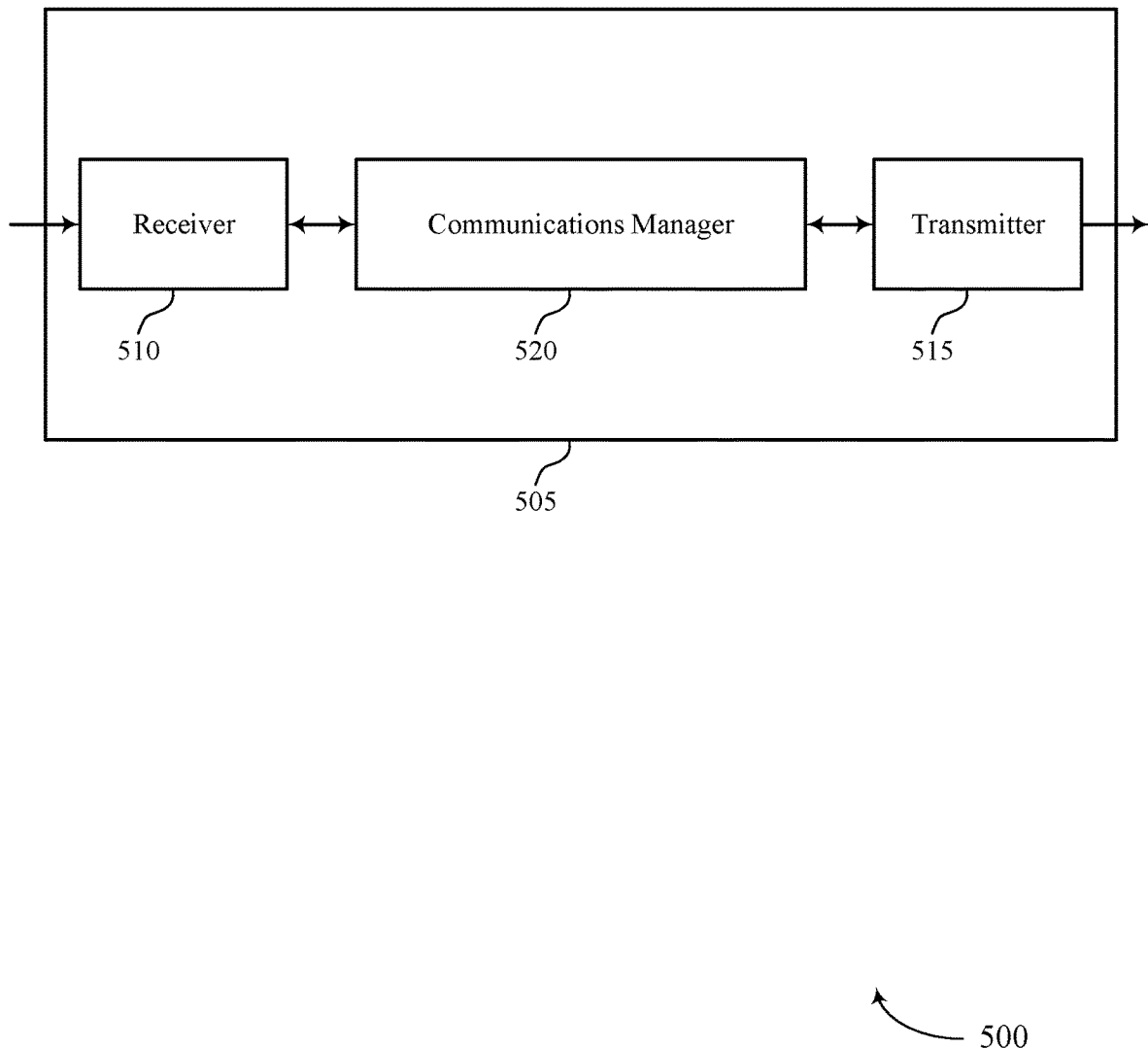
FIGS. 5 and 6 show block diagrams of devices that support a PHY signature for WUSs in accordance with one or more aspects of the present disclosure.

FIG. 5 shows a block diagram 500 of a device 505 that supports a PHY signature for WUSs in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to a PHY signature for WUSs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a PHY signature for WUSs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of a PHY signature for WUSs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 may be configured as or otherwise support a means for receiving a message indicating a configuration for one or more WUSs, the configuration indicating whether the one or more WUSs are modified by a PHY signature. The communications manager 520 may be configured as or otherwise support a means for receiving a WUS during a monitoring occasion associated with a discontinuous reception cycle. The communications manager 520 may be configured as or otherwise support a means for communicating with a network entity based on a comparison between a PHY signature of the received WUS and an expected PHY signature in accordance with the configuration.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reducing malicious attacks in fake WUSs resulting in reduced processing, reduced power consumption, more efficient utilization of communication resources, and reduced signaling overhead.

Figure 6:
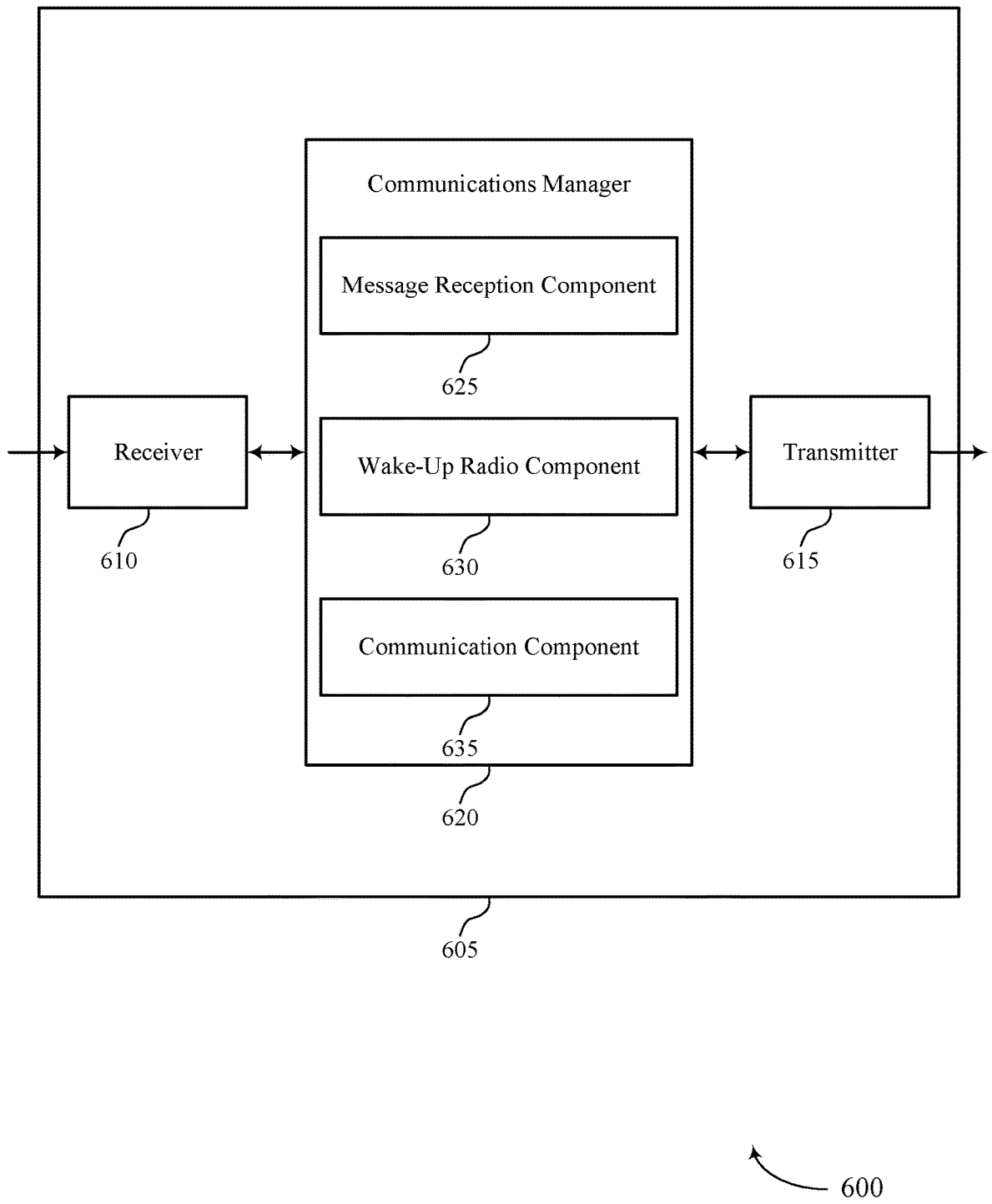

FIG. 6 shows a block diagram 600 of a device 605 that supports a PHY signature for WUSs in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a PHY signature for WUSs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a PHY signature for WUSs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of a PHY signature for WUSs as described herein. For example, the communications manager 620 may include a message reception component 625, a wake-up radio component 630, a communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The message reception component 625 may be configured as or otherwise support a means for receiving a message indicating a configuration for one or more WUSs, the configuration indicating whether the one or more WUSs are modified by a PHY signature. The wake-up radio component 630 may be configured as or otherwise support a means for receiving a WUS during a monitoring occasion associated with a discontinuous reception cycle. The communication component 635 may be configured as or otherwise support a means for communicating with a network entity based on a comparison between a PHY signature of the received WUS and an expected PHY signature in accordance with the configuration.

Figure 7:
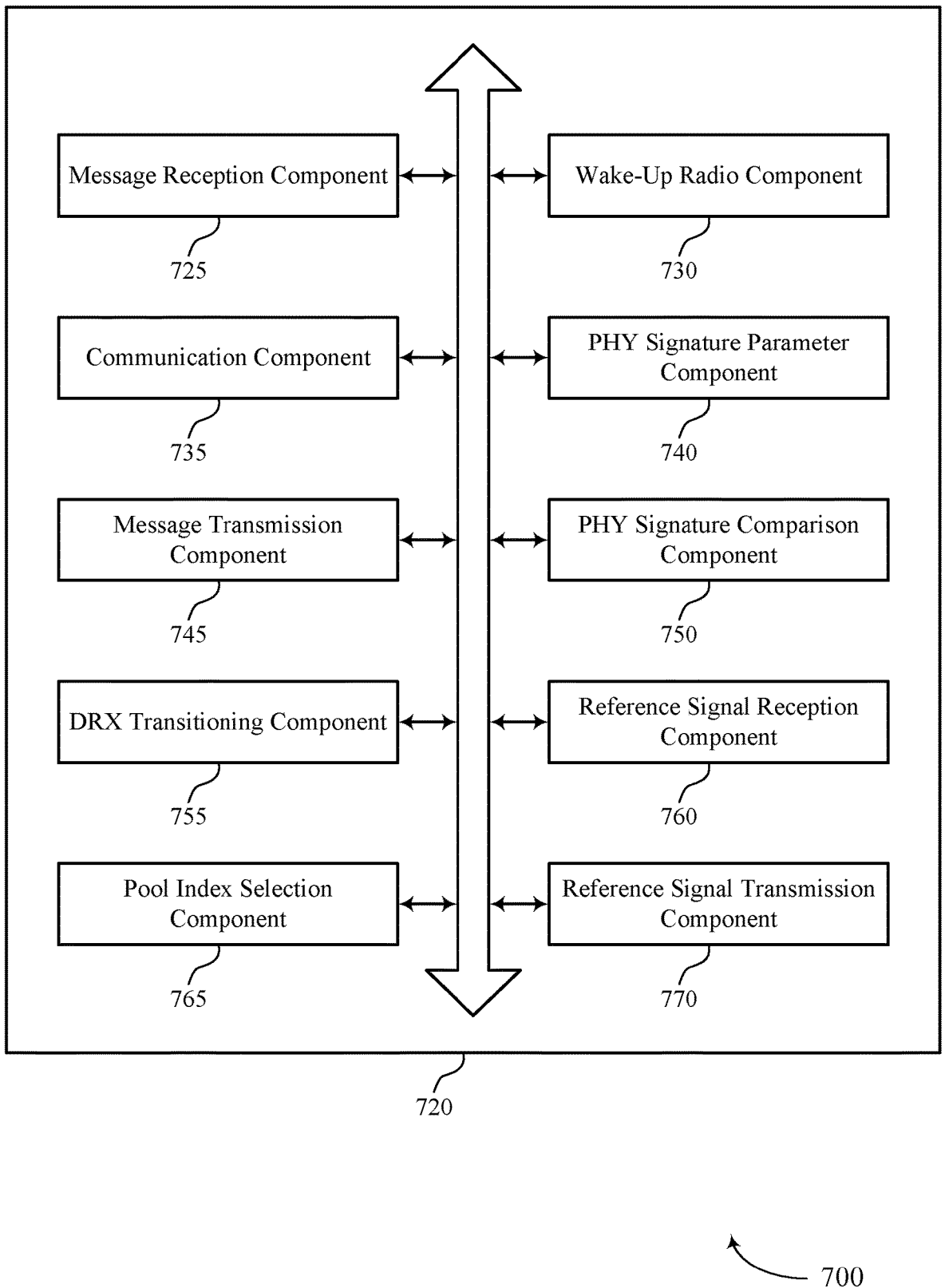
FIG. 7 shows a block diagram of a communications manager that supports a PHY signature for WUSs in accordance with one or more aspects of the present disclosure.

FIG. 7 shows a block diagram 700 of a communications manager 720 that supports a PHY signature for WUSs in accordance with one or more aspects of the present disclosure. The communications manager 720 may be an example of aspects of a communications manager 520, a communications manager 620, or both, as described herein. The communications manager 720, or various components thereof, may be an example of means for performing various aspects supporting a PHY signature for WUSs as described herein. For example, the communications manager 720 may include a message reception component 725, a wake-up radio component 730, a communication component 735, an PHY signature parameter component 740, a message transmission component 745, an PHY signature comparison component 750, a DRX transitioning component 755, a reference signal reception component 760, a pool index selection component 765, a reference signal transmission component 770, or any combination thereof. Each of these components may communicate, directly or indirectly, with one another (e.g., via one or more buses).

The communications manager 720 may support wireless communications in accordance with examples as disclosed herein. The message reception component 725 may be configured as or otherwise support a means for receiving a message indicating a configuration for one or more WUSs, the configuration indicating whether the one or more WUSs are modified by a PHY signature. The wake-up radio component 730 may be configured as or otherwise support a means for receiving a WUS during a monitoring occasion associated with a discontinuous reception cycle. The communication component 735 may be configured as or otherwise support a means for communicating with a network entity based on a comparison between a PHY signature of the received WUS and an expected PHY signature in accordance with the configuration.

In some examples, the PHY signature parameter component 740 may be configured as or otherwise support a means for determining one or more parameters associated with the PHY signature. In some examples, the message transmission component 745 may be configured as or otherwise support a means for transmitting a second message indicating the one or more parameters, where the configuration indicating whether the one or more WUSs are modified by the PHY signature is based on transmitting the second message indicating the one or more parameters.

In some examples, the second message is transmitted via a MAC-CE, or RRC signaling, or any combination thereof.

In some examples, the message reception component 725 may be configured as or otherwise support a means for receiving a third message indicating one or more parameters associated with the PHY signature, where the configuration indicating whether the one or more WUSs are modified by the PHY signature is based on the one or more parameters.

In some examples, the third message is transmitted via a MAC-CE, or RRC signaling, or any combination thereof.

In some examples, the message reception component 725 may be configured as or otherwise support a means for receiving a first control message indicating a signature pool including a set of PHY signatures including the PHY signature, where each PHY signature of the set of PHY signatures is associated with a respective index.

In some examples, the message transmission component 745 may be configured as or otherwise support a means for transmitting a second control message including an index of the PHY signature, where the configuration indicating whether the one or more WUSs are modified by the PHY signature is based on transmitting the second control message.

In some examples, the message reception component 725 may be configured as or otherwise support a means for receiving a third control message including an index of the PHY signature, where the configuration indicating whether the one or more WUSs are modified by the PHY signature is based on the index of the PHY signature.

In some examples, the reference signal reception component 760 may be configured as or otherwise support a means for receiving one or more reference signals on a channel between the UE and the network entity. In some examples, the pool index selection component 765 may be configured as or otherwise support a means for selecting an index of the PHY signature based on one or more characteristics of the channel, the one or more characteristics being determined based on measuring the one or more reference signals.

In some examples, the one or more reference signals include demodulated reference signals.

In some examples, the reference signal transmission component 770 may be configured as or otherwise support a means for transmitting one or more reference signals on a channel between the UE and the network entity, where an index of the PHY signature is based on one or more characteristics of the channel, the one or more characteristics being based on the one or more reference signals.

In some examples, the one or more reference signals include a sounding reference signal, a demodulated reference signal, or any combination thereof.

In some examples, the PHY signature comparison component 750 may be configured as or otherwise support a means for determining that the received WUS includes the PHY signature based on the comparison between the received WUS and the expected WUS. In some examples, the DRX transitioning component 755 may be configured as or otherwise support a means for transitioning to an awake state based on the determination.

In some examples, the PHY signature comparison component 750 may be configured as or otherwise support a means for determining that the received WUS does not include the PHY signature based on the comparison between the received WUS and the expected PHY signature. In some examples, the DRX transitioning component 755 may be configured as or otherwise support a means for remaining in an off state of the discontinuous reception cycle based on the determination.

In some examples, the message transmission component 745 may be configured as or otherwise support a means for transmitting an indication of an adversarial attack based on the received WUS not including the PHY signature.

In some examples, the message indicating the configuration for the one or more WUSs further includes one or more monitoring occasions to monitor for the one or more WUSs.

Figure 8:
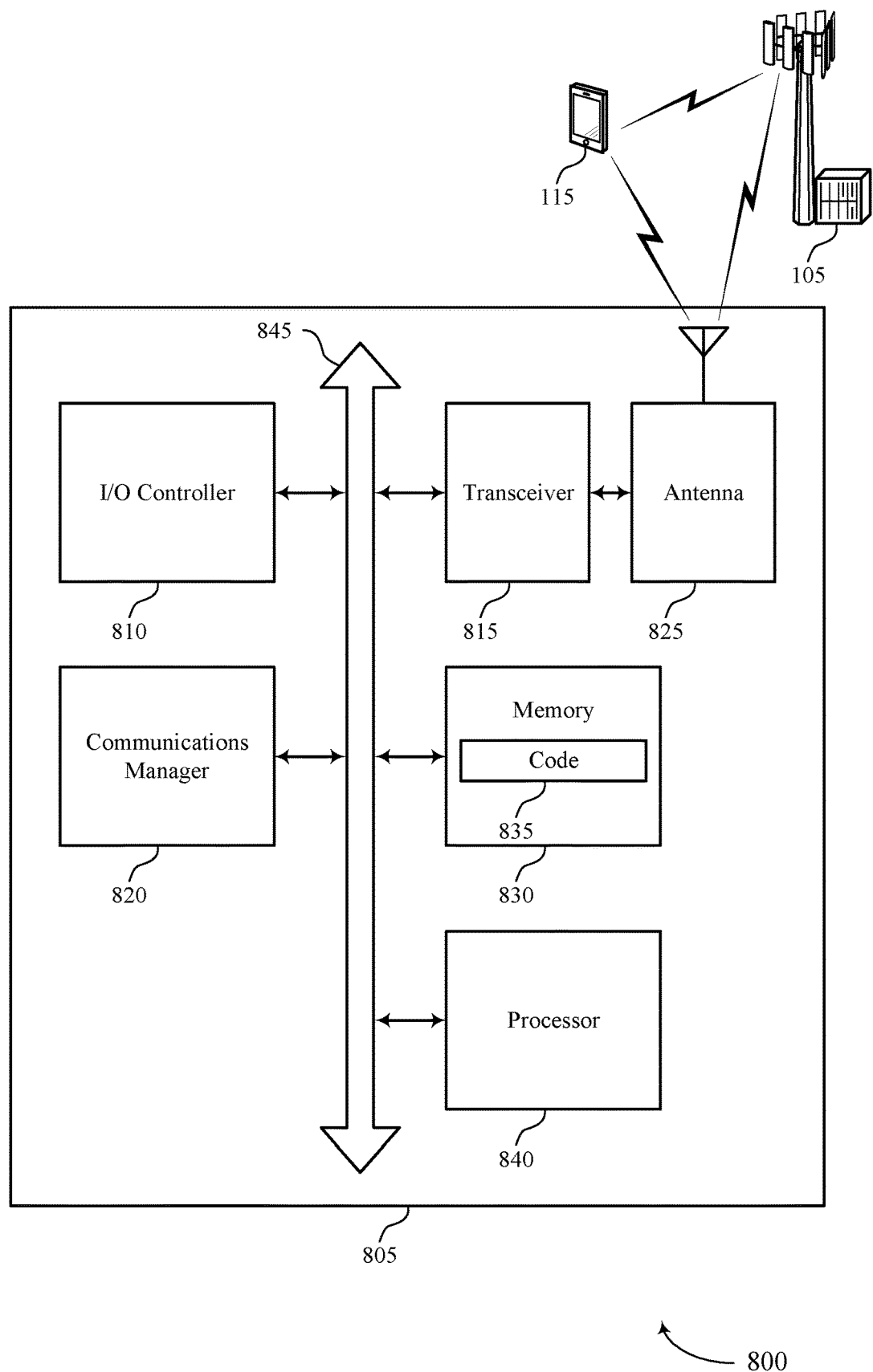
FIG. 8 shows a diagram of a system including a device that supports a PHY signature for WUSs in accordance with one or more aspects of the present disclosure.

FIG. 8 shows a diagram of a system 800 including a device 805 that supports a PHY signature for WUSs in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting a PHY signature for WUSs). For example, the device 805 or a component of the device 805 may include a processor 840 and memory 830 coupled with or to the processor 840, the processor 840 and memory 830 configured to perform various functions described herein.

The communications manager 820 may support wireless communications in accordance with examples as disclosed herein. For example, the communications manager 820 may be configured as or otherwise support a means for receiving a message indicating a configuration for one or more WUSs, the configuration indicating whether the one or more WUSs are modified by a PHY signature. The communications manager 820 may be configured as or otherwise support a means for receiving a WUS during a monitoring occasion associated with a discontinuous reception cycle. The communications manager 820 may be configured as or otherwise support a means for communicating with a network entity based on a comparison between a PHY signature of the received WUS and an expected PHY signature in accordance with the configuration.

By including or configuring the communications manager 820 in accordance with examples as described herein, the device 805 may support techniques for reducing malicious attacks in fake WUSs resulting in improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of a PHY signature for WUSs as described herein, or the processor 840 and the memory 830 may be otherwise configured to perform or support such operations.

Figure 9:
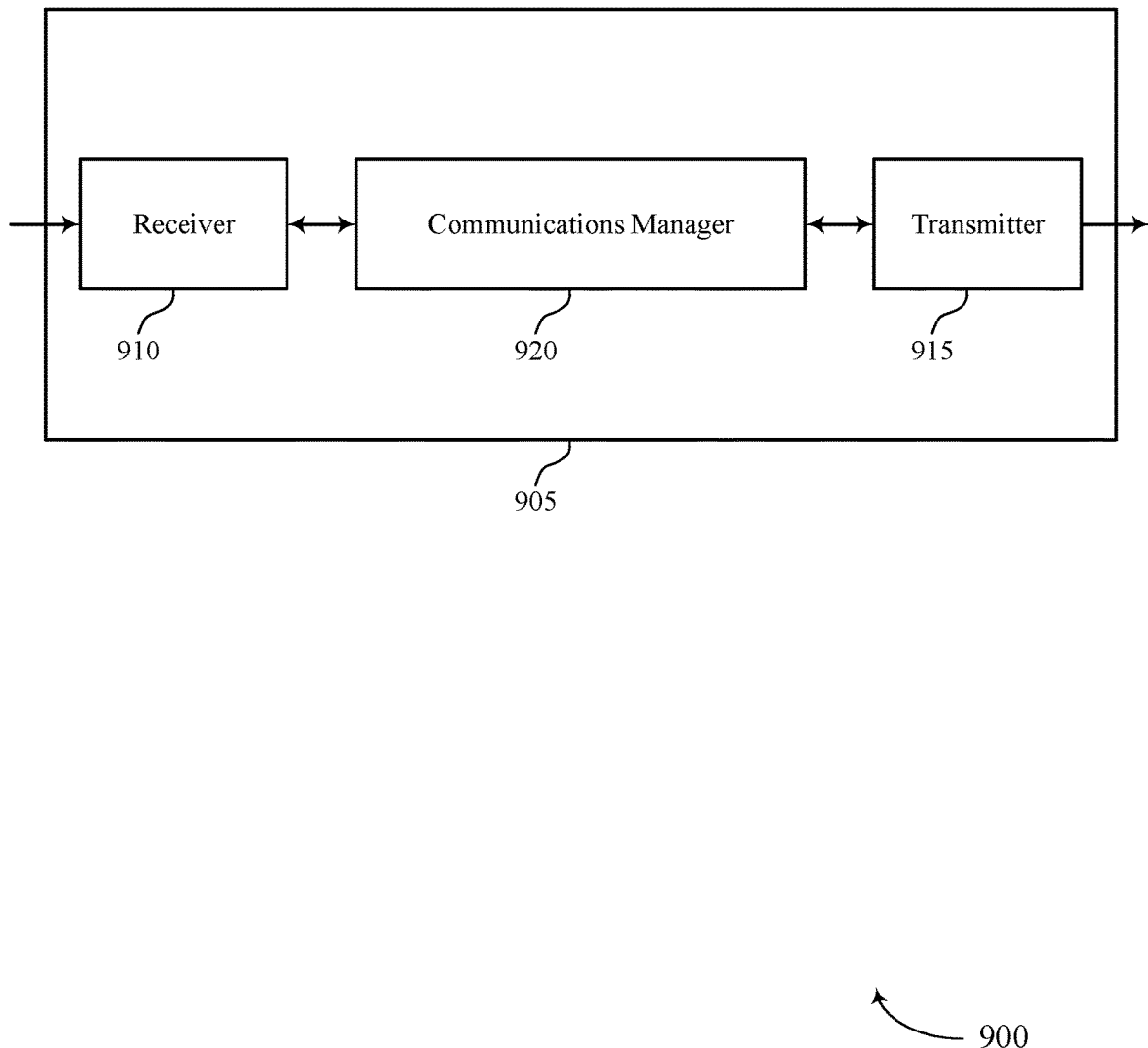
FIGS. 9 and 10 show block diagrams of devices that support a PHY signature for WUSs in accordance with one or more aspects of the present disclosure.

FIG. 9 shows a block diagram 900 of a device 905 that supports a PHY signature for WUSs in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of a PHY signature for WUSs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 may be configured as or otherwise support a means for transmitting a message indicating a configuration for one or more WUSs, the configuration indicating whether the one or more WUSs are modified by a PHY signature. The communications manager 920 may be configured as or otherwise support a means for transmitting a WUS modified by the PHY signature during a monitoring occasion associated with a discontinuous reception cycle. The communications manager 920 may be configured as or otherwise support a means for communicating with a UE based on transmitting the WUS modified by the PHY signature.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reducing malicious attacks in fake WUSs resulting in reduced processing, reduced power consumption, more efficient utilization of communication resources, and reduced signaling overhead.

Figure 10:
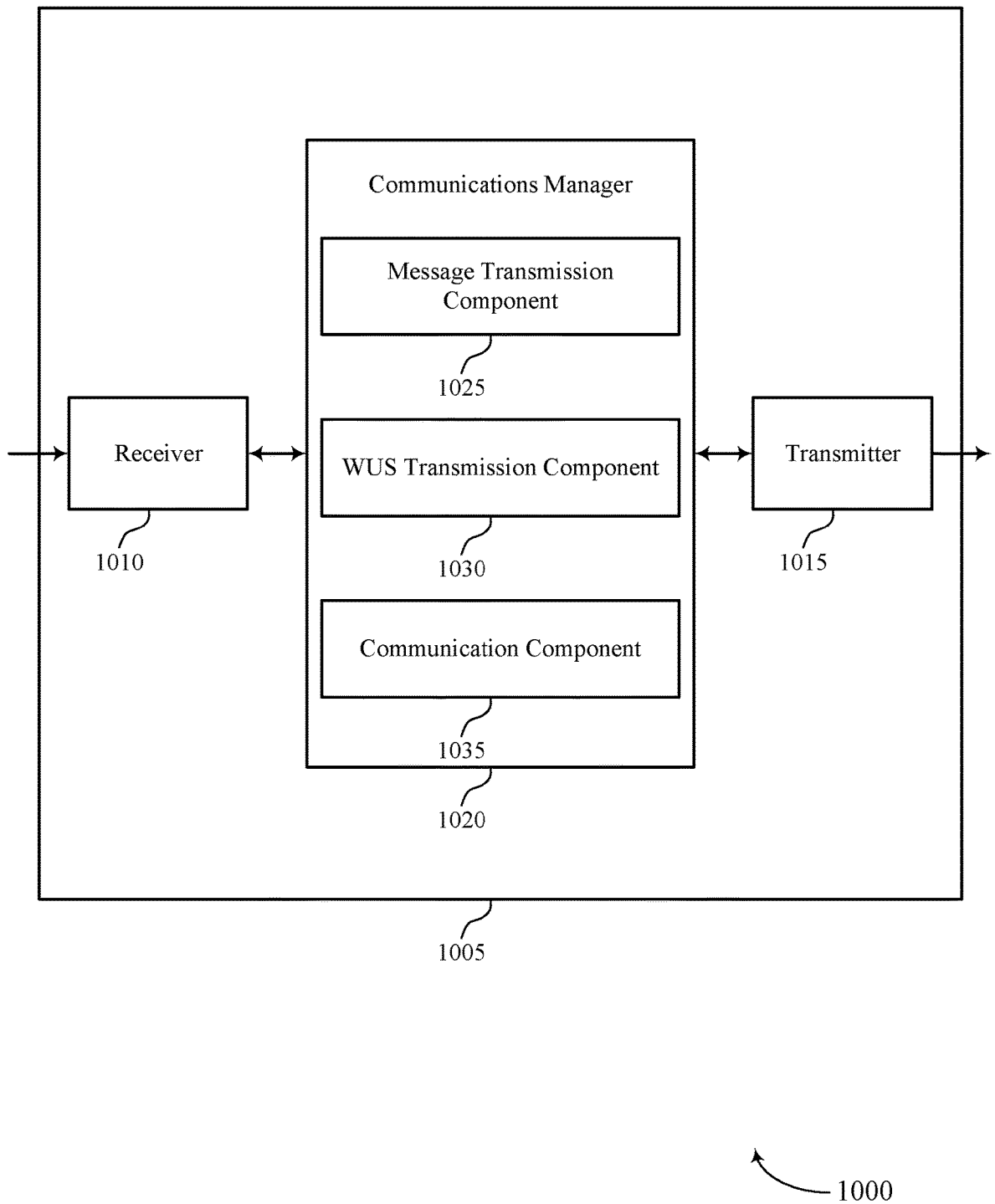

FIG. 10 shows a block diagram 1000 of a device 1005 that supports a PHY signature for WUSs in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of a PHY signature for WUSs as described herein. For example, the communications manager 1020 may include a message transmission component 1025, a WUS transmission component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The message transmission component 1025 may be configured as or otherwise support a means for transmitting a message indicating a configuration for one or more WUSs, the configuration indicating whether the one or more WUSs are modified by a PHY signature. The WUS transmission component 1030 may be configured as or otherwise support a means for transmitting a WUS modified by the PHY signature during a monitoring occasion associated with a discontinuous reception cycle. The communication component 1035 may be configured as or otherwise support a means for communicating with a UE based on transmitting the WUS modified by the PHY signature.

Figure 11:
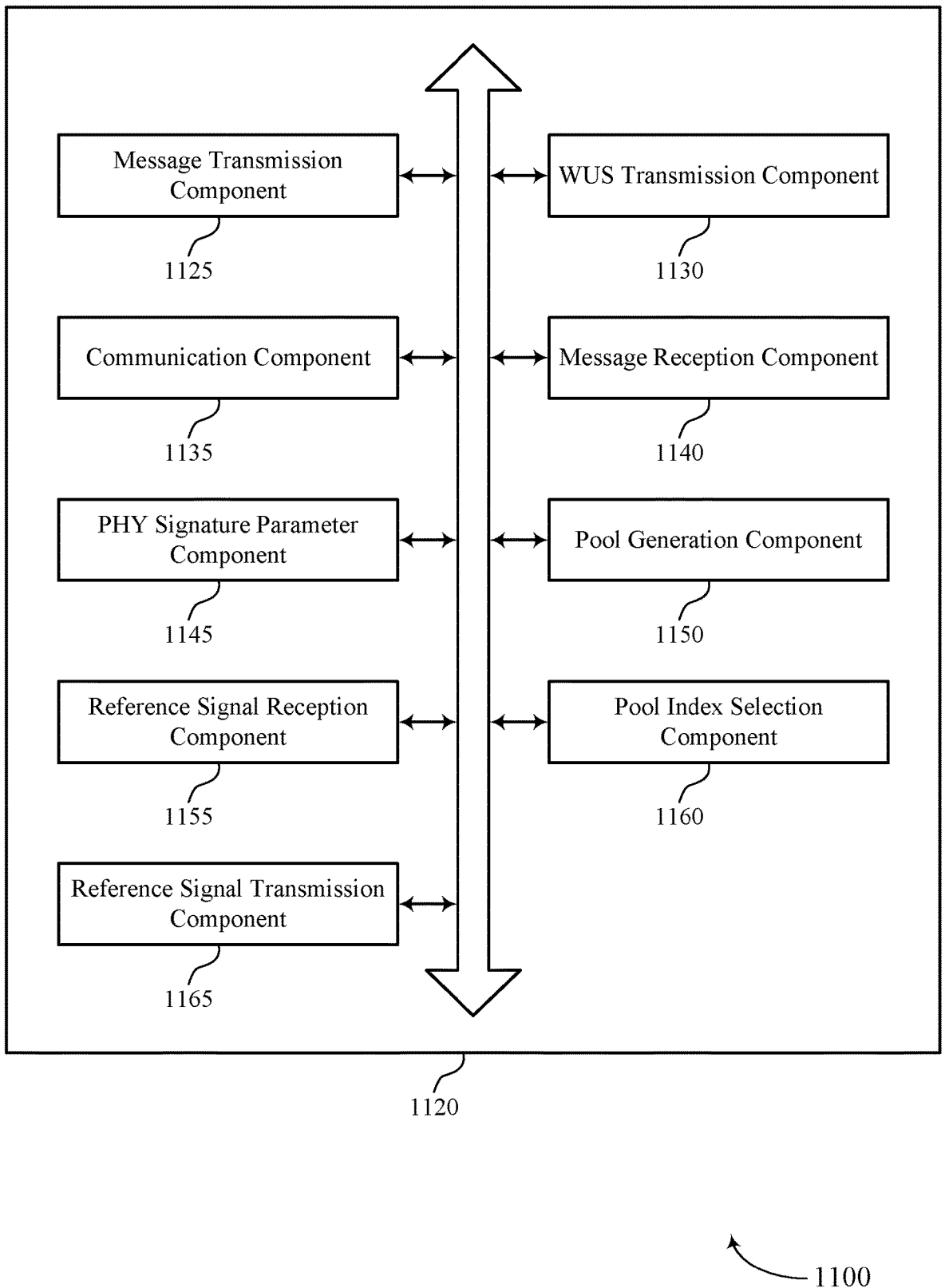
FIG. 11 shows a block diagram of a communications manager that supports a PHY signature for WUSs in accordance with one or more aspects of the present disclosure.

FIG. 11 shows a block diagram 1100 of a communications manager 1120 that supports a PHY signature for WUSs in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects that support a PHY signature for WUSs as described herein. For example, the communications manager 1120 may include a message transmission component 1125, a WUS transmission component 1130, a communication component 1135, a message reception component 1140, an PHY signature parameter component 1145, a pool generation component 1150, a reference signal reception component 1155, a pool index selection component 1160, a reference signal transmission component 1165, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The message transmission component 1125 may be configured as or otherwise support a means for transmitting a message indicating a configuration for one or more WUSs, the configuration indicating whether the one or more WUSs are modified by a PHY signature. The WUS transmission component 1130 may be configured as or otherwise support a means for transmitting a WUS modified by the PHY signature during a monitoring occasion associated with a discontinuous reception cycle. The communication component 1135 may be configured as or otherwise support a means for communicating with a UE based on transmitting the WUS modified by the PHY signature.

In some examples, the message reception component 1140 may be configured as or otherwise support a means for receiving, a second message indicating one or more parameters associated with the PHY signature, where the configuration indicating whether the one or more WUSs are modified by the PHY signature is based on the one or more parameters.

In some examples, the second message is received via a MAC-CE, or RRC signaling, or any combination thereof.

In some examples, the PHY signature parameter component 1145 may be configured as or otherwise support a means for determining one or more parameters associated with the PHY signature. In some examples, the message transmission component 1125 may be configured as or otherwise support a means for transmitting, a third message indicating the one or more parameters associated with the PHY signature, where the configuration indicating whether the one or more WUSs are modified by the PHY signature is based on transmitting the third message indicating the one or more parameters.

In some examples, the third message is received via a MAC-CE, or RRC signaling, or any combination thereof.

In some examples, the pool generation component 1150 may be configured as or otherwise support a means for generating a signature pool including a set of PHY signatures including the PHY signature, where each PHY signature of the set of PHY signatures is associated with a respective index. In some examples, the message transmission component 1125 may be configured as or otherwise support a means for transmitting a first control message indicating the signature pool based on generating the signature pool.

In some examples, the message reception component 1140 may be configured as or otherwise support a means for receiving, a second control message including an index of the PHY signature, where the configuration indicating whether the one or more WUSs are modified by the PHY signature is based on receiving the second control message.

In some examples, the message transmission component 1125 may be configured as or otherwise support a means for transmitting a third control message including an index of the PHY signature, where the configuration indicating whether the one or more WUSs are modified by the PHY signature is based on the index of the PHY signature.

In some examples, the reference signal reception component 1155 may be configured as or otherwise support a means for receiving one or more reference signals on a channel between the UE and the network entity. In some examples, the pool index selection component 1160 may be configured as or otherwise support a means for selecting an index of the PHY signature based on one or more characteristics of the channel, the one or more characteristics being determined based on measuring the one or more reference signals.

In some examples, the reference signal transmission component 1165 may be configured as or otherwise support a means for transmitting one or more reference signals on a channel between the UE and the network entity, where an index of the PHY signature is based on one or more characteristics of the channel, the one or more characteristics being based on the one or more reference signals.

In some examples, to support communicating based on transmitting the WUS modified by the PHY signature, the message reception component 1140 may be configured as or otherwise support a means for receiving an indication of an adversarial attack based on the UE receiving a second WUS not including the PHY signature.

In some examples, to support message indicating the configuration for the one or more WUSs, the message transmission component 1125 may be configured as or otherwise support a means for one or more monitoring occasions for the UE to monitor for the one or more WUSs.

Figure 12:
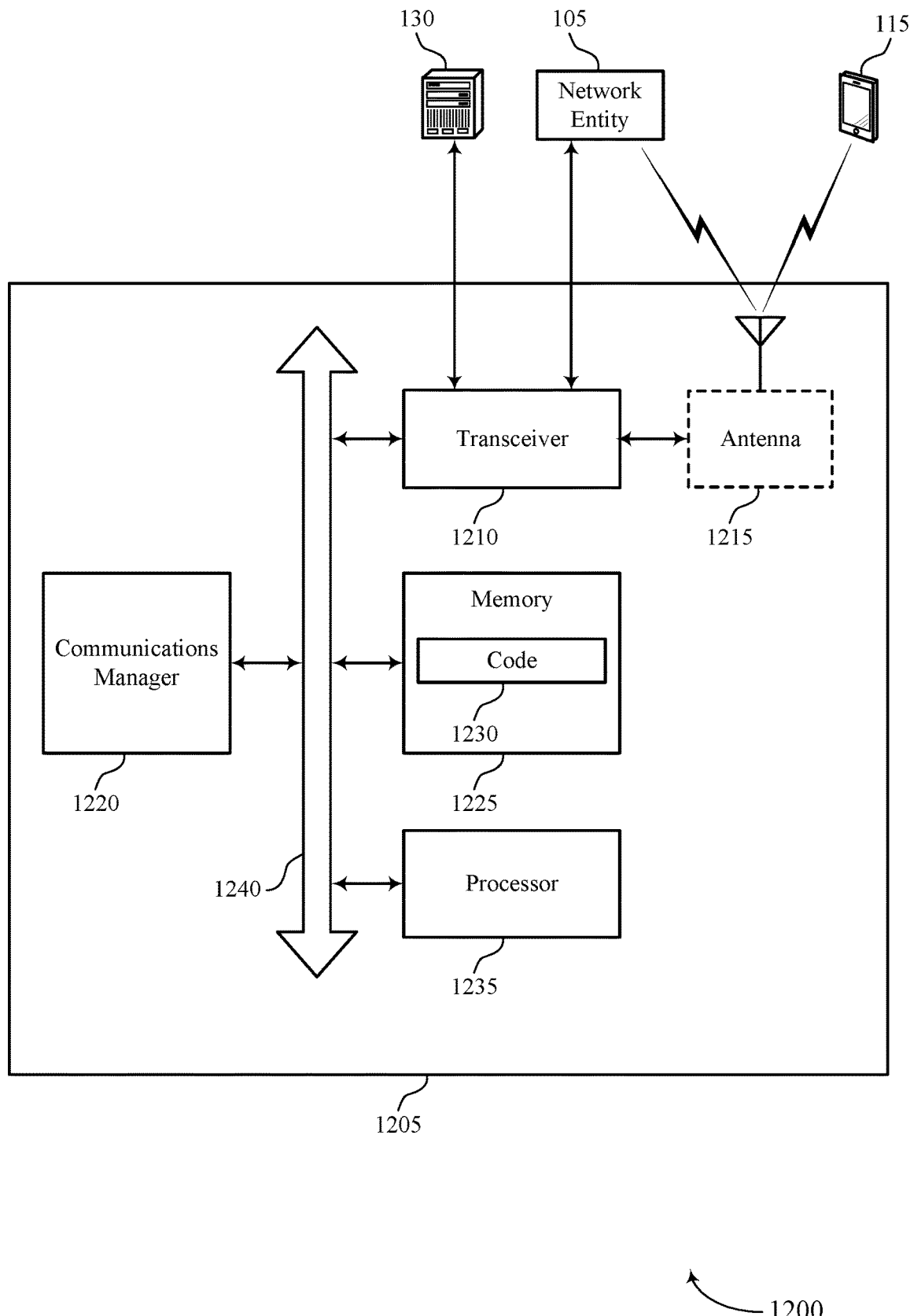
FIG. 12 shows a diagram of a system including a device that supports a PHY signature for WUSs in accordance with one or more aspects of the present disclosure.

FIG. 12 shows a diagram of a system 1200 including a device 1205 that supports a PHY signature for WUSs in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting a PHY signature for WUSs). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 may be configured as or otherwise support a means for transmitting a message indicating a configuration for one or more WUSs, the configuration indicating whether the one or more WUSs are modified by a PHY signature. The communications manager 1220 may be configured as or otherwise support a means for transmitting a WUS modified by the PHY signature during a monitoring occasion associated with a discontinuous reception cycle. The communications manager 1220 may be configured as or otherwise support a means for communicating with a UE based on transmitting the WUS modified by the PHY signature.

By including or configuring the communications manager 1220 in accordance with examples as described herein, the device 1205 may support techniques for reducing malicious attacks in fake WUSs resulting in improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of a PHY signature for WUSs as described herein, or the processor 1235 and the memory 1225 may be otherwise configured to perform or support such operations.

Figure 13:
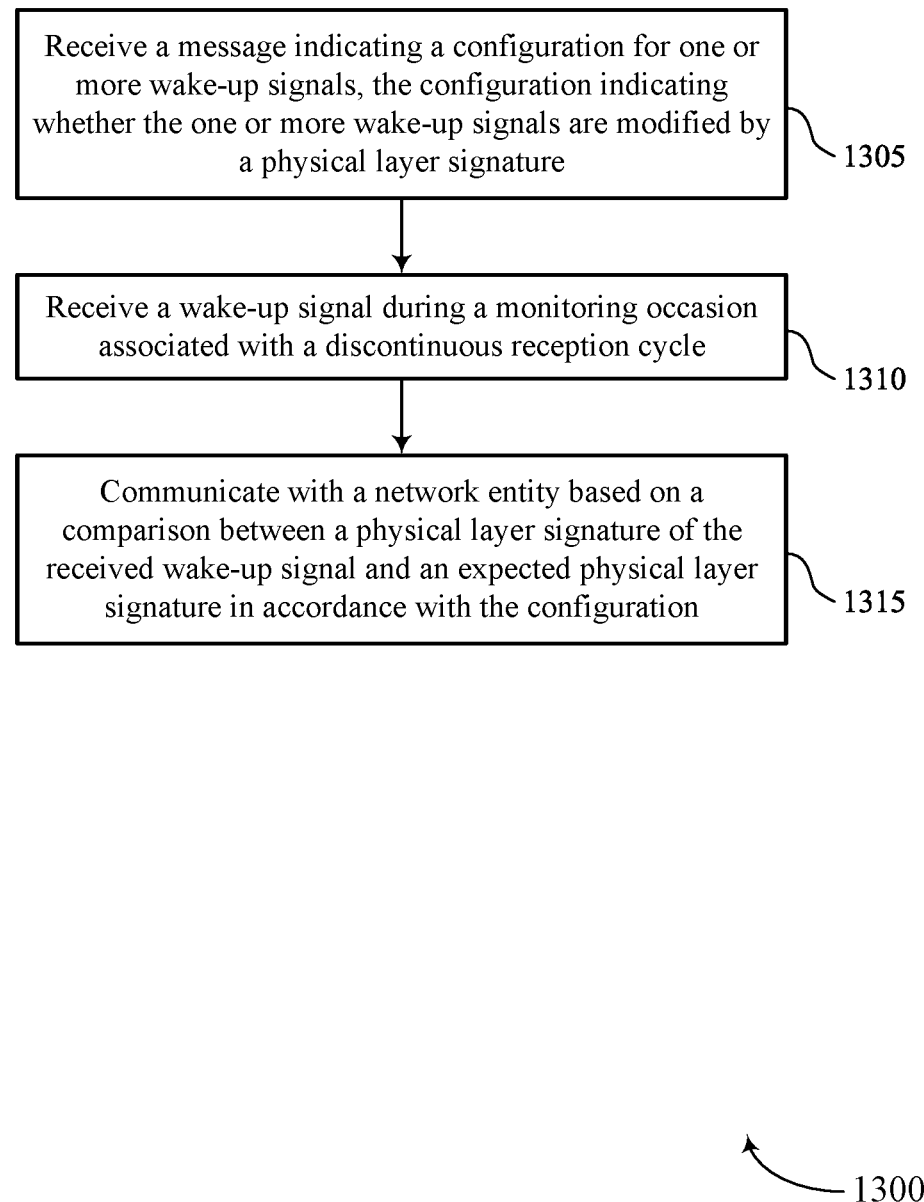
FIGS. 13 through 16 show flowcharts illustrating methods that support a PHY signature for WUSs in accordance with one or more aspects of the present disclosure.

FIG. 13 shows a flowchart illustrating a method 1300 that supports a PHY signature for WUSs in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a message indicating a configuration for one or more WUSs, the configuration indicating whether the one or more WUSs are modified by a PHY signature. The operations of 1305 may be performed in accordance with examples as disclosed herein. In some examples, aspects of the operations of 1305 may be performed by a message reception component 725 as described with reference to FIG. 7.

At 1310, the method may include receiving a WUS during a monitoring occasion associated with a discontinuous reception cycle. The operations of 1310 may be performed in accordance with examples as disclosed herein. In some examples, aspects of the operations of 1310 may be performed by a wake-up radio component 730 as described with reference to FIG. 7.

At 1315, the method may include communicating with a network entity based on a comparison between a PHY signature of the received WUS and an expected PHY signature in accordance with the configuration. The operations of 1315 may be performed in accordance with examples as disclosed herein. In some examples, aspects of the operations of 1315 may be performed by a communication component 735 as described with reference to FIG. 7.

Figure 14:
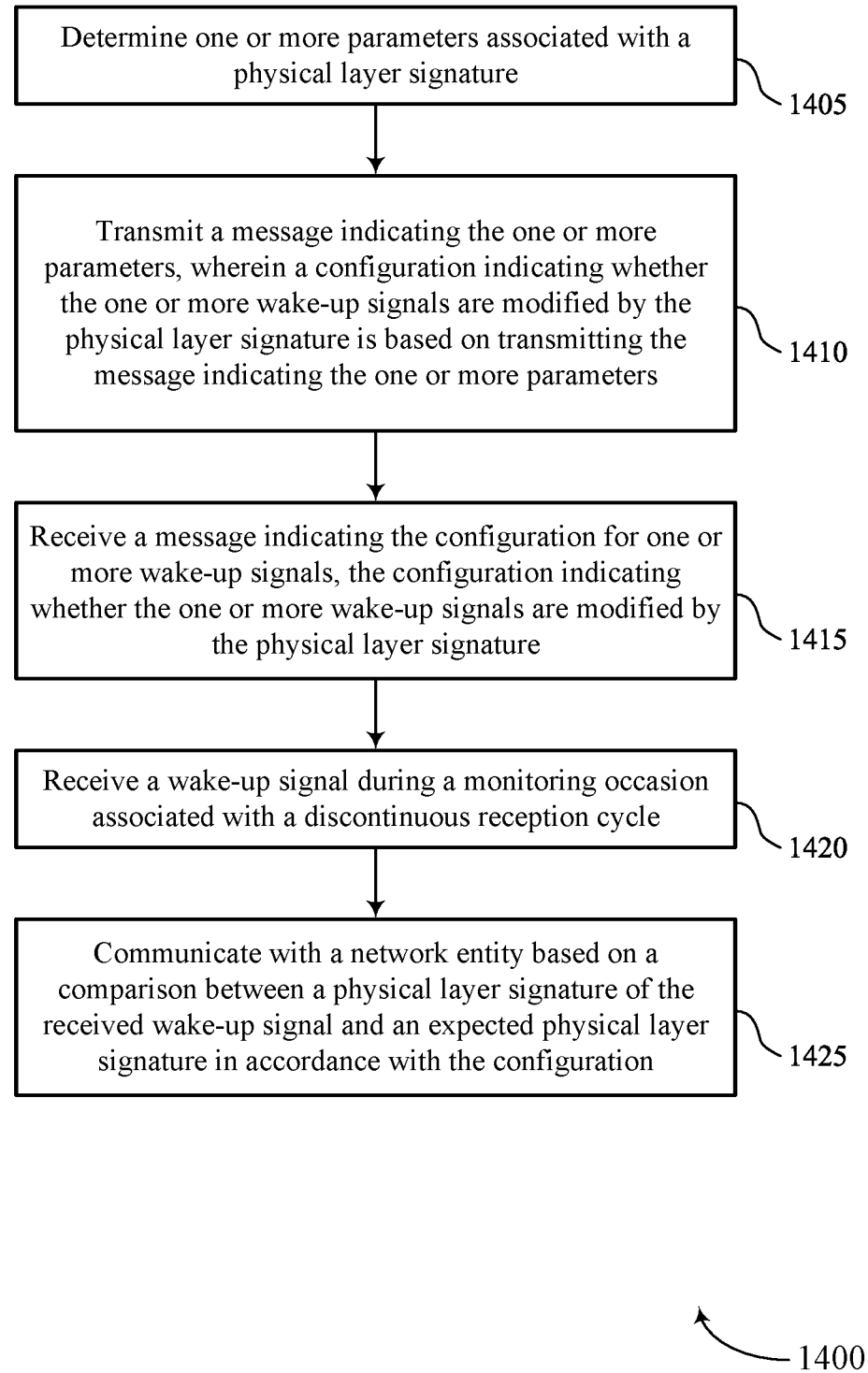

FIG. 14 shows a flowchart illustrating a method 1400 that supports a PHY signature for WUSs in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include determining one or more parameters associated with a PHY signature. The operations of 1405 may be performed in accordance with examples as disclosed herein. In some examples, aspects of the operations of 1405 may be performed by an PHY signature parameter component 740 as described with reference to FIG. 7.

At 1410, the method may include transmitting a message indicating the one or more parameters, where a configuration indicating whether the one or more WUSs are modified by the PHY signature is based on transmitting the message indicating the one or more parameters. The operations of 1410 may be performed in accordance with examples as disclosed herein. In some examples, aspects of the operations of 1410 may be performed by a message transmission component 745 as described with reference to FIG. 7.

At 1415, the method may include receiving a message indicating the configuration for one or more WUSs, the configuration indicating whether the one or more WUSs are modified by the PHY signature. The operations of 1415 may be performed in accordance with examples as disclosed herein. In some examples, aspects of the operations of 1415 may be performed by a message reception component 725 as described with reference to FIG. 7.

At 1420, the method may include receiving a WUS during a monitoring occasion associated with a discontinuous reception cycle. The operations of 1420 may be performed in accordance with examples as disclosed herein. In some examples, aspects of the operations of 1420 may be performed by a wake-up radio component 730 as described with reference to FIG. 7.

At 1425, the method may include communicating with a network entity based on a comparison between a PHY signature of the received WUS and an expected PHY signature in accordance with the configuration. The operations of 1425 may be performed in accordance with examples as disclosed herein. In some examples, aspects of the operations of 1425 may be performed by a communication component 735 as described with reference to FIG. 7.

Figure 15:
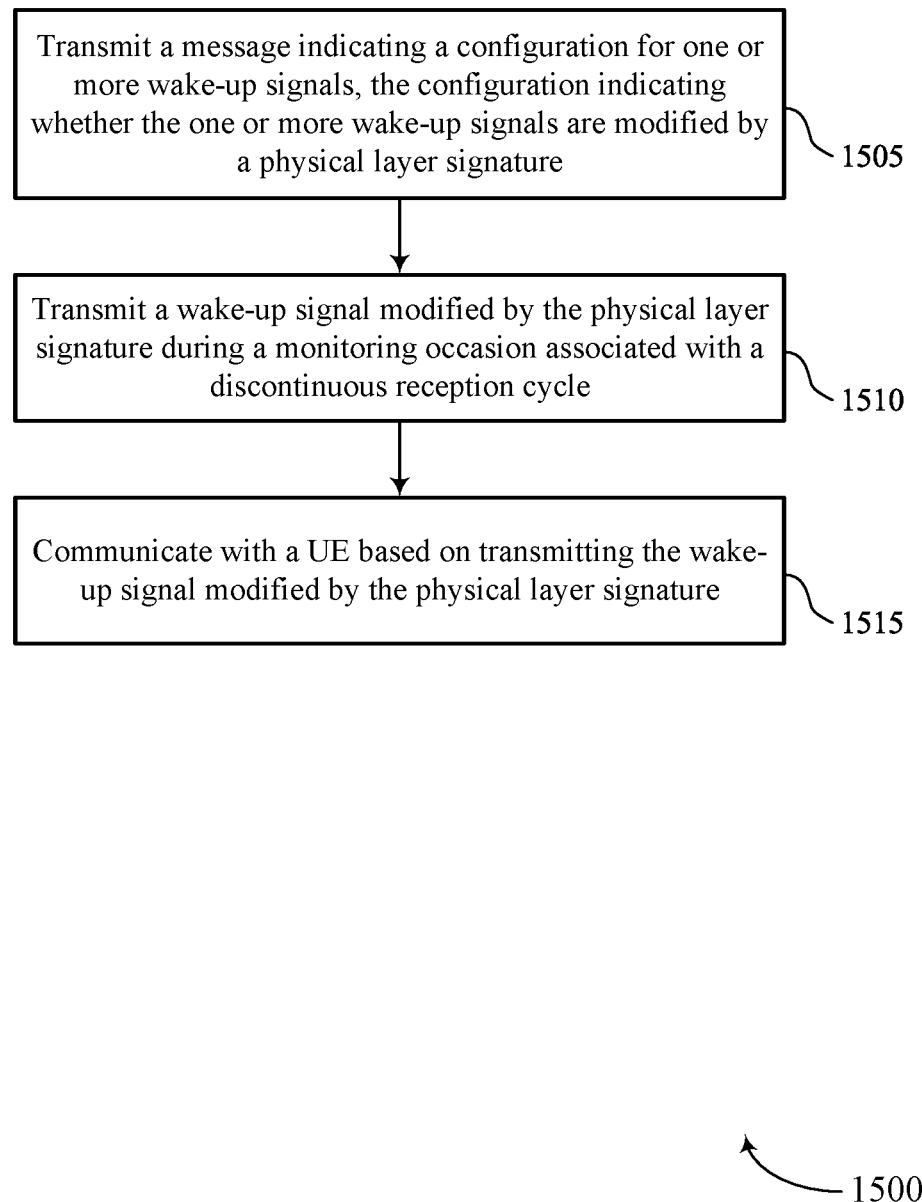

FIG. 15 shows a flowchart illustrating a method 1500 that supports a PHY signature for WUSs in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a message indicating a configuration for one or more WUSs, the configuration indicating whether the one or more WUSs are modified by a PHY signature. The operations of 1505 may be performed in accordance with examples as disclosed herein. In some examples, aspects of the operations of 1505 may be performed by a message transmission component 1125 as described with reference to FIG. 11.

At 1510, the method may include transmitting a WUS modified by the PHY signature during a monitoring occasion associated with a discontinuous reception cycle. The operations of 1510 may be performed in accordance with examples as disclosed herein. In some examples, aspects of the operations of 1510 may be performed by a WUS transmission component 1130 as described with reference to FIG. 11.

At 1515, the method may include communicating with a UE based on transmitting the WUS modified by the PHY signature. The operations of 1515 may be performed in accordance with examples as disclosed herein. In some examples, aspects of the operations of 1515 may be performed by a communication component 1135 as described with reference to FIG. 11.

Figure 16:
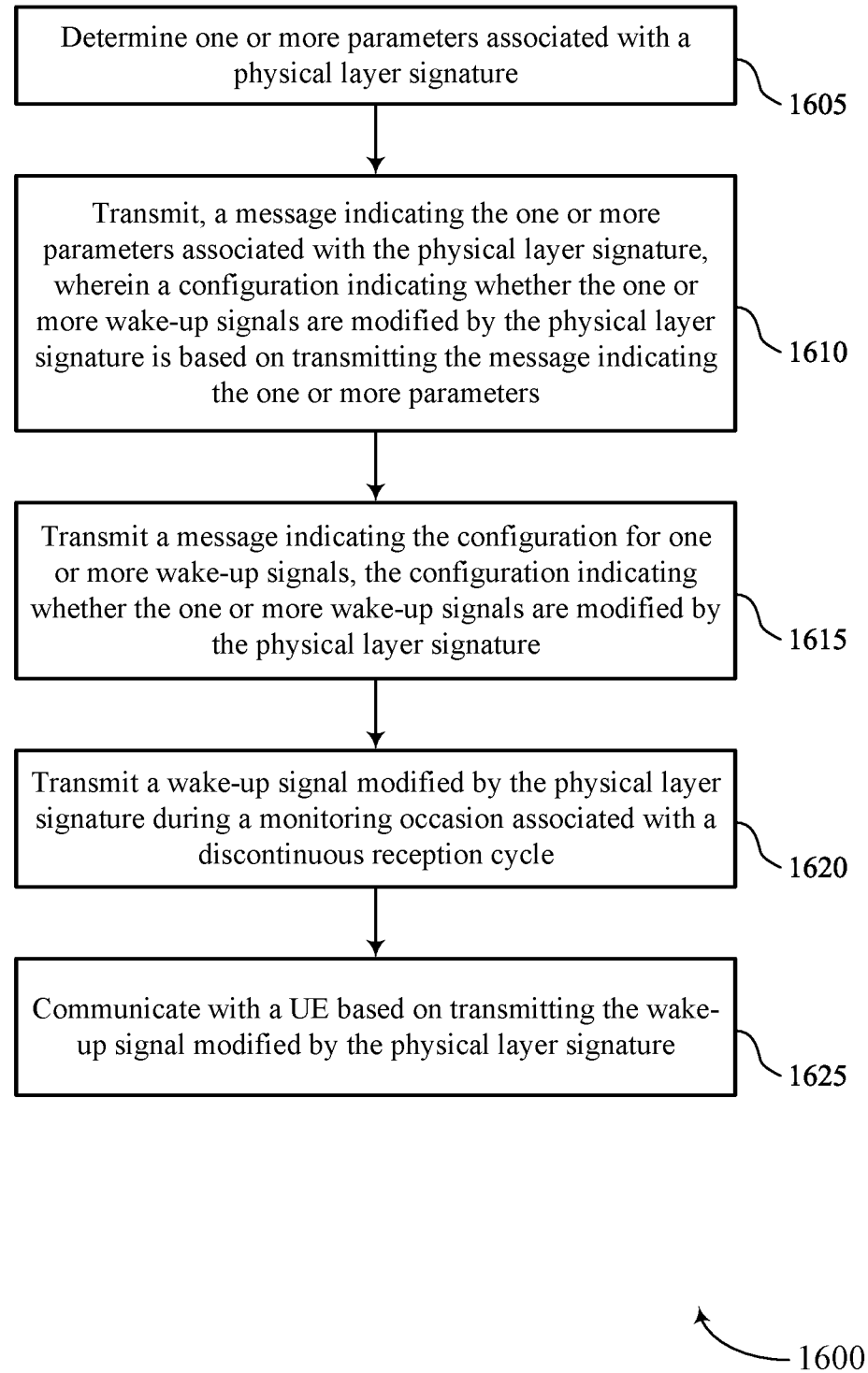

FIG. 16 shows a flowchart illustrating a method 1600 that supports a PHY signature for WUSs in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include determining one or more parameters associated with a PHY signature. The operations of 1605 may be performed in accordance with examples as disclosed herein. In some examples, aspects of the operations of 1605 may be performed by an PHY signature parameter component 1145 as described with reference to FIG. 11.

At 1610, the method may include transmitting, a message indicating the one or more parameters associated with the PHY signature, where a configuration indicating whether the one or more WUSs are modified by the PHY signature is based on transmitting the message indicating the one or more parameters. The operations of 1610 may be performed in accordance with examples as disclosed herein. In some examples, aspects of the operations of 1610 may be performed by a message transmission component 1125 as described with reference to FIG. 11.

At 1615, the method may include transmitting a message indicating the configuration for one or more WUSs, the configuration indicating whether the one or more WUSs are modified by the PHY signature. The operations of 1615 may be performed in accordance with examples as disclosed herein. In some examples, aspects of the operations of 1615 may be performed by a message transmission component 1125 as described with reference to FIG. 11.

At 1620, the method may include transmitting a WUS modified by the PHY signature during a monitoring occasion associated with a discontinuous reception cycle. The operations of 1620 may be performed in accordance with examples as disclosed herein. In some examples, aspects of the operations of 1620 may be performed by a WUS transmission component 1130 as described with reference to FIG. 11.

At 1625, the method may include communicating with a UE based on transmitting the WUS modified by the PHY signature. The operations of 1625 may be performed in accordance with examples as disclosed herein. In some examples, aspects of the operations of 1625 may be performed by a communication component 1135 as described with reference to FIG. 11.

The following provides an overview of aspects of the present disclosure:

Aspect 1: A method for wireless communications at a UE, comprising: receiving a message indicating a configuration for one or more WUSs, the configuration indicating whether the one or more WUSs are modified by a PHY signature; receiving a WUS during a monitoring occasion associated with a DRX cycle; and communicating with a network entity based at least in part on a comparison between a PHY signature of the received WUS and an expected PHY signature in accordance with the configuration.

Aspect 2: The method of aspect 1, further comprising: determining one or more parameters associated with the PHY signature; and transmitting a second message indicating the one or more parameters, wherein the configuration indicating whether the one or more WUSs are modified by the PHY signature is based at least in part on transmitting the second message indicating the one or more parameters.

Aspect 3: The method of aspect 2, wherein the second message is transmitted via a MAC-CE, or RRC signaling, or any combination thereof.

Aspect 4: The method of any of aspects 1 through 3, further comprising: receiving a third message indicating one or more parameters associated with the PHY signature, wherein the configuration indicating whether the one or more WUSs are modified by the PHY signature is based at least in part on the one or more parameters.

Aspect 5: The method of aspect 4, wherein the third message is transmitted via a MAC-CE, or RRC signaling, or any combination thereof.

Aspect 6: The method of any of aspects 1 through 5, further comprising: receiving a first control message indicating a signature pool comprising a set of PHY signatures including the PHY signature, wherein each PHY signature of the set of PHY signatures is associated with a respective index.

Aspect 7: The method of aspect 6, further comprising: transmitting a second control message comprising an index of the PHY signature, wherein the configuration indicating whether the one or more WUSs are modified by the PHY signature is based at least in part on transmitting the second control message.

Aspect 8: The method of any of aspects 6 through 7, further comprising: receiving a third control message comprising an index of the PHY signature, wherein the configuration indicating whether the one or more WUSs are modified by the PHY signature is based at least in part on the index of the PHY signature.

Aspect 9: The method of any of aspects 6 through 8, further comprising: receiving one or more reference signals on a channel between the UE and the network entity; and selecting an index of the PHY signature based at least in part on one or more characteristics of the channel, the one or more characteristics being determined based at least in part on measuring the one or more reference signals.

Aspect 10: The method of aspect 9, wherein the one or more reference signals comprise demodulated reference signals.

Aspect 11: The method of any of aspects 6 through 10, further comprising: transmitting one or more reference signals on a channel between the UE and the network entity, wherein an index of the PHY signature is based at least in part on one or more characteristics of the channel, the one or more characteristics being based at least in part on the one or more reference signals.

Aspect 12: The method of aspect 11, wherein the one or more reference signals comprise a sounding reference signal, a demodulated reference signal, or any combination thereof.

Aspect 13: The method of any of aspects 1 through 12, further comprising: determining that the received WUS includes the PHY signature based at least in part on the comparison between the received WUS and the expected WUS; and transitioning to an awake state based at least in part on the determination.

Aspect 14: The method of any of aspects 1 through 13, further comprising: determining that the received WUS does not include the PHY signature based at least in part on the comparison between the received WUS and the expected WUS; and remaining in an off state of the DRX cycle based at least in part on the determination.

Aspect 15: The method of aspect 14, further comprising: transmitting an indication of an adversarial attack based at least in part on the received WUS not including the PHY signature.

Aspect 16: The method of any of aspects 1 through 15, wherein the message indicating the configuration for the one or more WUSs further comprises one or more monitoring occasions to monitor for the one or more WUSs.

Aspect 17: A method for wireless communications at a network entity, comprising: transmitting a message indicating a configuration for one or more WUSs, the configuration indicating whether the one or more WUSs are modified by a PHY signature; transmitting a WUS modified by the PHY signature during a monitoring occasion associated with a DRX cycle; and communicating with a UE based at least in part on transmitting the WUS modified by the PHY signature.

Aspect 18: The method of aspect 17, further comprising: receiving, a second message indicating one or more parameters associated with the PHY signature, wherein the configuration indicating whether the one or more WUSs are modified by the PHY signature is based at least in part on the one or more parameters.

Aspect 19: The method of aspect 18, wherein the second message is received via a MAC-CE, or RRC signaling, or any combination thereof.

Aspect 20: The method of any of aspects 17 through 19, further comprising: determining one or more parameters associated with the PHY signature; and transmitting, a third message indicating the one or more parameters associated with the PHY signature, wherein the configuration indicating whether the one or more WUSs are modified by the PHY signature is based at least in part on transmitting the third message indicating the one or more parameters.

Aspect 21: The method of aspect 20, wherein the third message is received via a MAC-CE, or RRC signaling, or any combination thereof.

Aspect 22: The method of any of aspects 17 through 21, further comprising: generating a signature pool comprising a set of PHY signatures including the PHY signature, wherein each PHY signature of the set of PHY signatures is associated with a respective index; and transmitting a first control message indicating the signature pool based at least in part on generating the signature pool.

Aspect 23: The method of aspect 22, further comprising: receiving, a second control message comprising an index of the PHY signature, wherein the configuration indicating whether the one or more WUSs are modified by the PHY signature is based at least in part on receiving the second control message.

Aspect 24: The method of any of aspects 22 through 23, further comprising: transmitting a third control message comprising an index of the PHY signature, wherein the configuration indicating whether the one or more WUSs are modified by the PHY signature is based at least in part on the index of the PHY signature.

Aspect 25: The method of any of aspects 22 through 24, further comprising: receiving one or more reference signals on a channel between the UE and the network entity; and selecting an index of the PHY signature based at least in part on one or more characteristics of the channel, the one or more characteristics being determined based at least in part on measuring the one or more reference signals.

Aspect 26: The method of any of aspects 22 through 25, further comprising: transmitting one or more reference signals on a channel between the UE and the network entity, wherein an index of the PHY signature is based at least in part on one or more characteristics of the channel, the one or more characteristics being based at least in part on the one or more reference signals.

Aspect 27: The method of any of aspects 22 through 26, wherein communicating based at least in part on transmitting the WUS modified by the PHY signature further comprises: receiving an indication of an adversarial attack based at least in part on the UE receiving a second WUS not including the PHY signature.

Aspect 28: The method of any of aspects 17 through 27, wherein the message indicating the configuration for the one or more WUSs further comprises: one or more monitoring occasions for the UE to monitor for the one or more WUSs.

Aspect 29: An apparatus for wireless communications, comprising a processor; memory coupled with the processor; and instructions stored in the memory and executable by the processor to cause the apparatus to perform a method of any of aspects 1 through 16.

Aspect 30: An apparatus for wireless communications, comprising at least one means for performing a method of any of aspects 1 through 16.

Aspect 31: A non-transitory computer-readable medium storing code for wireless communications, the code comprising instructions executable by a processor to perform a method of any of aspects 1 through 16.

Aspect 32: An apparatus for wireless communications, comprising a processor; memory coupled with the processor; and instructions stored in the memory and executable by the processor to cause the apparatus to perform a method of any of aspects 17 through 28.

Aspect 33: An apparatus for wireless communications, comprising at least one means for performing a method of any of aspects 17 through 28.

Aspect 34: A non-transitory computer-readable medium storing code for wireless communications, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a message indicating a configuration for one or more wake-up signals, the configuration indicating whether the one or more wake-up signals are modified by a first physical layer signature;
   receiving a first control message indicating a signature pool comprising a set of physical layer signatures including the first physical layer signature, wherein each physical layer signature of the set of physical layer signatures is associated with a respective index;
   communicating a second control message comprising an index of the first physical layer signature, wherein the configuration indicating whether the one or more wake-up signals are modified by the first physical layer signature is based at least in part on transmitting the second control message;
   receiving a wake-up signal during a monitoring occasion associated with a discontinuous reception cycle and prior to an on duration of the discontinuous reception cycle; and
   communicating with a network entity during the on duration of the discontinuous reception cycle based at least in part on a second physical layer signature of the received wake-up signal matching the first physical layer signature.

2. The method of claim 1, further comprising:
   determining one or more parameters associated with the first physical layer signature; and
   transmitting a second message indicating the one or more parameters, wherein the configuration indicating whether the one or more wake-up signals are modified by the first physical layer signature is based at least in part on transmitting the second message indicating the one or more parameters.

3. The method of claim 2, wherein the second message is transmitted via a medium access control-control element (MAC-CE), or radio resource control signaling, or any combination thereof.

4. The method of claim 1, further comprising:
   receiving a third message indicating one or more parameters associated with the first physical layer signature, wherein the configuration indicating whether the one or more wake-up signals are modified by the first physical layer signature is based at least in part on the one or more parameters.

5. The method of claim 4, wherein the third message is received via a MAC-CE, or radio resource control signaling, or any combination thereof.

6. The method of claim 1,
wherein the configuration indicating whether the one or more wake-up signals are modified by the first physical layer signature is based at least in part on the index of the first physical layer signature.

7. The method of claim 1, further comprising:
receiving one or more reference signals via a channel between the UE and the network entity; and
selecting the index of the first physical layer signature based at least in part on one or more characteristics of the channel, the one or more characteristics being determined based at least in part on measuring the one or more reference signals.

8. The method of claim 7, wherein the one or more reference signals comprise demodulated reference signals.

9. The method of claim 1, further comprising:
transmitting one or more reference signals via a channel between the UE and the network entity, wherein the index of the first physical layer signature is based at least in part on one or more characteristics of the channel, the one or more characteristics being based at least in part on the one or more reference signals.

10. The method of claim 9, wherein the one or more reference signals comprise a sounding reference signal, a demodulated reference signal, or any combination thereof.

11. The method of claim 1, further comprising:
determining that the received wake-up signal includes the first physical layer signature based at least in part on the second physical layer signature of the received wake-up signal matching the first physical layer signature; and
transitioning to an awake state based at least in part on the determination.

12. The method of claim 1, further comprising:
determining that the received wake-up signal does not include the first physical layer signature based at least in part on the second physical layer signature of the received wake-up signal not matching the first physical layer signature; and
remaining in an off state of the discontinuous reception cycle based at least in part on the determination.

13. The method of claim 12, further comprising:
transmitting an indication of an adversarial attack based at least in part on the received wake-up signal not including the first physical layer signature.

14. The method of claim 1, wherein the message indicating the configuration for the one or more wake-up signals further comprises one or more monitoring occasions to monitor for the one or more wake-up signals.

15. A method for wireless communications at a network entity, comprising:
transmitting a message indicating a configuration for one or more wake-up signals, the configuration indicating whether the one or more wake-up signals are modified by a first physical layer signature;
transmitting a first control message indicating a signature pool generated to include a set of physical layer signatures including the first physical layer signature, wherein each physical layer signature of the set of physical layer signatures is associated with a respective index;

communicating a second control message comprising an index of the first physical layer signature, wherein the configuration indicating whether the one or more wake-up signals are modified by the first physical layer signature is based at least in part on transmitting the second control message;
transmitting, during a monitoring occasion associated with a discontinuous reception cycle and prior to an on duration of the discontinuous reception cycle, a wake-up signal modified by the first physical layer signature; and
communicating with a user equipment (UE) during the on duration of the discontinuous reception cycle based at least in part on transmitting the wake-up signal being modified by the first physical layer signature.

16. The method of claim 15, further comprising:
receiving, a second message indicating one or more parameters associated with the first physical layer signature, wherein the configuration indicating whether the one or more wake-up signals are modified by the first physical layer signature is based at least in part on the one or more parameters.

17. The method of claim 16, wherein the second message is received via a medium access control-control element (MAC-CE), or radio resource control signaling, or any combination thereof.

18. The method of claim 15, further comprising:
determining one or more parameters associated with the first physical layer signature; and
transmitting, a third message indicating the one or more parameters associated with the first physical layer signature, wherein the configuration indicating whether the one or more wake-up signals are modified by the first physical layer signature is based at least in part on transmitting the third message indicating the one or more parameters.

19. The method of claim 18, wherein the third message is transmitted via a medium access control-control element (MAC-CE), or radio resource control signaling, or any combination thereof.

20. The method of claim 15,
wherein the configuration indicating whether the one or more wake-up signals are modified by the first physical layer signature is based at least in part on the index of the first physical layer signature.

21. The method of claim 15, further comprising:
receiving one or more reference signals via a channel between the UE and the network entity; and
selecting the index of the first physical layer signature based at least in part on one or more characteristics of the channel, the one or more characteristics being determined based at least in part on measuring the one or more reference signals.

22. The method of claim 15, further comprising:
transmitting one or more reference signals via a channel between the UE and the network entity, wherein the index of the first physical layer signature is based at least in part on one or more characteristics of the channel, the one or more characteristics being based at least in part on the one or more reference signals.

23. The method of claim 15, wherein communicating based at least in part on transmitting the wake-up signal modified by the first physical layer signature further comprises:
receiving an indication of an adversarial attack based at least in part on the UE receiving a second wake-up signal not including the first physical layer signature.

24. The method of claim 15, wherein the message indicating the configuration for the one or more wake-up signals further comprises:
  one or more monitoring occasions for the UE to monitor for the one or more wake-up signals.

25. An apparatus for wireless communications, comprising:
  one or more memories; and
  one or more processors coupled with the one or more memories and configured to:
    receive a message indicating a configuration for one or more wake-up signals, the configuration indicating whether the one or more wake-up signals are modified by a first physical layer signature;
    receive a first control message indicating a signature pool comprising a set of physical layer signatures including the first physical layer signature, wherein each physical layer signature of the set of physical layer signatures is associated with a respective index;
    communicate a second control message comprising an index of the first physical layer signature, wherein the configuration indicating whether the one or more wake-up signals are modified by the first physical layer signature is based at least in part on transmitting the second control message;
    receive a wake-up signal during a monitoring occasion associated with a discontinuous reception cycle and prior to an on duration of the discontinuous reception cycle; and
    communicate with a network entity during the on duration of the discontinuous reception cycle based at least in part on a second physical layer signature of the received wake-up signal matching the first physical layer signature.

26. An apparatus for wireless communications, comprising:
  one or more memories; and
  one or more processors coupled with the one or more memories and configured to:
    transmit a message indicating a configuration for one or more wake-up signals, the configuration indicating whether the one or more wake-up signals are modified by a first physical layer signature;
    transmit a first control message indicating a signature pool generated to include a set of physical layer signatures including the first physical layer signature, wherein each physical layer signature of the set of physical layer signatures is associated with a respective index;
    communicate a second control message comprising an index of the first physical layer signature, wherein the configuration indicating whether the one or more wake-up signals are modified by the first physical layer signature is based at least in part on transmitting the second control message;
    transmit during a monitoring occasion associated with a discontinuous reception cycle and prior to an on duration of the discontinuous reception cycle, a wake-up signal modified by the first physical layer signature; and
    communicate with a user equipment (UE) during the on duration of the discontinuous reception cycle based at least in part on transmitting the wake-up signal being modified by the first physical layer signature.

\* \* \* \* \*